(12) United States Patent
Jarrahi et al.

(10) Patent No.: US 11,249,017 B2
(45) Date of Patent: Feb. 15, 2022

(54) SYSTEMS AND METHODS FOR HIGH FREQUENCY NANOSCOPY

(71) Applicant: The Regents of the University of California, Oakland, CA (US)

(72) Inventors: Mona Jarrahi, Los Angeles, CA (US); Yen-Ju Lin, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 53 days.

(21) Appl. No.: 16/606,712

(22) PCT Filed: Apr. 20, 2018

(86) PCT No.: PCT/US2018/028579
§ 371 (c)(1),
(2) Date: Oct. 18, 2019

(87) PCT Pub. No.: WO2018/195429
PCT Pub. Date: Oct. 25, 2018

(65) Prior Publication Data
US 2020/0064259 A1    Feb. 27, 2020

Related U.S. Application Data

(60) Provisional application No. 62/487,974, filed on Apr. 20, 2017.

(51) Int. Cl.
*G01N 21/3586* (2014.01)
*G02B 6/122* (2006.01)
*G02B 21/00* (2006.01)

(52) U.S. Cl.
CPC ....... *G01N 21/3586* (2013.01); *G02B 6/1228* (2013.01); *G02B 21/0032* (2013.01); *G02B 21/0088* (2013.01)

(58) Field of Classification Search
CPC .............. G01N 21/3586; G02B 6/1228; G02B 21/0032; G02B 21/0088; G01Q 60/22; G01Q 30/02
(Continued)

(56) References Cited

U.S. PATENT DOCUMENTS 6,173,604 B1 * 1/2001 Xiang .................... B82Y 20/00
                                                              73/105
6,529,093 B2    3/2003 Ma
(Continued)

FOREIGN PATENT DOCUMENTS

EP    1804347 A1    7/2007
EP    2807675 A1    12/2014
(Continued)

OTHER PUBLICATIONS

Gregory et al., "Optimization of Photomixers and Antennas for Continuous-Wave Terahertz Emission", IEEE Journal of Quantum Electronics, vol. 41, No. 5, May 2005, pp. 717-728.
(Continued)

*Primary Examiner* — David P Porta
*Assistant Examiner* — Gisselle M Gutierrez
(74) *Attorney, Agent, or Firm* — KPPB LLP

(57) ABSTRACT

Many embodiments provide a high frequency near-field probe based on a tapered waveguide combined with at least one optically-pumped high frequency radiation source and at least one optically-probed high frequency radiation detector.

30 Claims, 11 Drawing Sheets

(58) Field of Classification Search
USPC .................................................. 250/338.1
See application file for complete search history.

(56) References Cited

U.S. PATENT DOCUMENTS

| | | | |
|---|---|---|---|
| 7,321,275 | B2 | 1/2008 | Chou et al. |
| 7,515,801 | B2 | 4/2009 | McCaughan et al. |
| 7,599,409 | B2 | 10/2009 | Nishizawa et al. |
| 7,710,637 | B2 | 5/2010 | Ikari et al. |
| 7,834,722 | B2 | 11/2010 | Millet |
| 7,915,641 | B2 | 3/2011 | Otsuji et al. |
| 8,450,687 | B2 | 5/2013 | Lampin et al. |
| 8,466,528 | B2 | 6/2013 | Okamoto et al. |
| 8,514,403 | B2 | 8/2013 | Ogawa et al. |
| 8,581,784 | B2 | 11/2013 | Nagel |
| 8,610,094 | B2 | 12/2013 | Kim et al. |
| 8,649,414 | B2 | 2/2014 | Park |
| 8,730,567 | B2 | 5/2014 | Kim et al. |
| 9,804,026 | B2 | 10/2017 | Jarrahi et al. |
| 9,859,079 | B2 | 1/2018 | Jarrahi et al. |
| 10,120,263 | B2 | 11/2018 | Jarrahi |
| 2001/0011704 | A1* | 8/2001 | Niwa .................. G01Q 60/06 850/30 |
| 2003/0184328 | A1 | 10/2003 | Lee et al. |
| 2004/0095147 | A1 | 5/2004 | Cole |
| 2005/0236260 | A1 | 10/2005 | Pasch et al. |
| 2006/0153262 | A1 | 7/2006 | Barbieri et al. |
| 2007/0216422 | A1 | 9/2007 | Sekiguchi |
| 2007/0278075 | A1 | 12/2007 | Terano et al. |
| 2008/0001691 | A1 | 1/2008 | Hong et al. |
| 2008/0277672 | A1 | 11/2008 | Hovey et al. |
| 2009/0261362 | A1* | 10/2009 | Ueda ................ H01L 21/02433 257/94 |
| 2009/0273532 | A1 | 11/2009 | Mendis et al. |
| 2010/0002739 | A1* | 1/2010 | Hu ............................ H01S 1/02 372/45.01 |
| 2010/0017922 | A1 | 1/2010 | Shin et al. |
| 2010/0102256 | A1 | 4/2010 | Andrew et al. |
| 2011/0074293 | A1 | 3/2011 | Hagmann et al. |
| 2011/0080329 | A1 | 4/2011 | Nagel |
| 2011/0141468 | A1 | 6/2011 | Kukushkin et al. |
| 2011/0149368 | A1 | 6/2011 | Kim et al. |
| 2011/0215246 | A1 | 9/2011 | Kajiki |
| 2012/0122259 | A1 | 5/2012 | Tung et al. |
| 2012/0147907 | A1 | 6/2012 | Kim et al. |
| 2012/0162747 | A1 | 6/2012 | Kim et al. |
| 2012/0205767 | A1 | 8/2012 | Bai et al. |
| 2013/0015375 | A1 | 1/2013 | Avouris et al. |
| 2013/0161541 | A1 | 6/2013 | Kim et al. |
| 2013/0284929 | A1 | 10/2013 | Ouchi |
| 2014/0346357 | A1 | 11/2014 | Jarrahi et al. |
| 2016/0064110 | A1 | 3/2016 | Schmadel et al. |
| 2016/0196943 | A1 | 7/2016 | Jarrahi et al. |
| 2017/0123292 | A1 | 5/2017 | Jarrahi |
| 2018/0058931 | A1 | 3/2018 | Jarrahi et al. |
| 2020/0264048 | A1 | 8/2020 | Jarrahi et al. |

FOREIGN PATENT DOCUMENTS

| | | |
|---|---|---|
| EP | 3155702 A1 | 4/2017 |
| EP | 2807675 B1 | 9/2018 |
| EP | 3612812 A1 | 2/2020 |
| JP | 2002511690 A | 4/2002 |
| JP | 2002511960 A | 4/2002 |
| JP | 2006216646 A | 8/2006 |
| JP | 2009105102 A | 5/2009 |
| JP | 2009531841 A | 9/2009 |
| JP | 2010510703 A | 4/2010 |
| JP | 2015513067 A | 4/2015 |
| JP | 6169614 B2 | 7/2017 |
| JP | 2017523601 A | 8/2017 |
| KR | 1020080004467 A | 1/2008 |
| WO | 1998046042 A1 | 10/1998 |
| WO | 2005019810 A2 | 3/2005 |
| WO | 2005019810 A3 | 5/2005 |
| WO | 2006030608 A1 | 3/2006 |
| WO | 2010011186 A1 | 1/2010 |
| WO | 2010021073 A1 | 2/2010 |
| WO | 2010044193 A1 | 4/2010 |
| WO | 2011028179 A1 | 3/2011 |
| WO | 2011118398 A1 | 9/2011 |
| WO | 2011129690 A2 | 10/2011 |
| WO | 2012057710 A1 | 5/2012 |
| WO | 2013112608 A1 | 8/2013 |
| WO | 2015021100 A1 | 2/2015 |
| WO | 2015192094 A1 | 12/2015 |
| WO | 2018195429 A1 | 10/2018 |

OTHER PUBLICATIONS

Gu et al., "Detection of Terahertz Radiation from Longitudinal Optical Phonon-Plasmon Coupling Modes in InSb Film Using an Ultrabroadband Photoconductive Antenna", Applied Physics Letters, American Institute of Physics, vol. 77, No. 12, Sep. 18, 2000, pp. 1798-1800.

Heshmat et al., "Nanoplasmonic Terahertz Photoconductive Switch on GaAs", American Chemical Society, Nano Letters, vol. 12, Nov. 21, 2012, pp. 6255-6259.

Hsieh et al., "Analysis of periodic metallic nano-slits for efficient interaction of terahertz and optical waves at nano-scale dimensions", Journal of Applied Physics, 2011, vol. 109, pp. 084326-1-084326-5.

Huo et al., "Planar Log-Periodic Antennas on Extended Hemispherical Silicon Lenses for Millimeter/Submillimeter Wave Detection Applications", International Journal of Infrared and Millimeter Waves, vol. 23, No. 6, Jun. 2002, pp. 819-839.

Liu et al., "Coherent Detection of Multiband Terahertz Radiation Using a Surface Plasmon-Polariton Based Photoconductive Antenna", IEEE Transactions on Terahertz Science and Technology, vol. 1, No. 2, Nov. 2011, Manuscript published Oct. 10, 2011, pp. 412-415.

Loata et al., "Radiation field screening in photoconductive antennae studied via pulse terahertz emission spectroscopy", Applied Physics Letters, vol. 91, 2007, pp. 232506-1-232506-3.

Mangeney et al., "Continuous wave terahertz generation up to 2 THz by photomixing on ion-irradiated In0.53GA0.47As at 1.55 µm wavelengths", Applied Physics Letters, vol. 91, 2007, pp. 241102-1-241102-3.

Michael et al., "Large-area traveling-wave photonic mixers for increased continuous terahertz power", Applied Physics Letters, vol. 86, No. 111120, 2005, pp. 111120-1-111120-3.

Middendorf et al., "THz generation using extrinsic photoconductivity at 1550 nm", Optics Express, vol. 20, No. 15, Jul. 16, 2012, pp. 16504-16509.

Okyay et al., "High Efficiency Metal-Semiconductor-Metal Photodetectors on Heteroepitaxially Grown Ge on Si", Optics Letters, vol. 31, No. 17, Sep. 1, 2006, pp. 2565-2567, DOI: 10.1364/OL.31.002565.

Park et al., "Enhancement of Terahertz Pulse Emission by Optical Nanoantenna", American Chemical Society, ACS Nano, No. 6, No. 3, 2012, published online Feb. 17, 2012, pp. 2026-2031.

Park et al., "Terahertz photoconductive antenna with meal nanoislands", Optics Express, vol. 20, No. 23, Nov. 5, 2012, 6 pgs.

Peytavit et al., "Continuous terahertz-wave generation using a monolithically integrated horn antenna", Applied Physics Letters, 2008, vol. 93, pp. 111108-1-111108-3.

Peytavit et al., "Milliwatt-level output power in the sub-terahertz range generated by photomixing in a GaAs photoconductor", Applied Physics Letters, vol. 99, No. 223508, 2011, pp. 223508-1-223508-3.

Preu et al., "Tunable, continuous-wave Terahertz photomixer sources and applications", Journal of Applied Physics, vol. 109, 2011, pp. 061301-1-061301-56.

Roehle et al., "Next generation 1.5 µm terahertz antennas: mesa-structuring of InGaAs/InAlAs photoconductive layers", Optics Express, vol. 18, No. 3, Feb. 1, 2010, pp. 2296-2301.

Shen et al., "Properties of a one-dimensional metallophotonic crystal", Physical Review B, 2004, vol. 70, pp. 035101-1-038101-8.

Shibuya et al., "Enhancement of THz photomixing efficiency by using a pulse-modulated multimode laser diode", Infrared and Millimeter Waves, Sep. 1, 2007, pp. 732-733.

(56) References Cited

OTHER PUBLICATIONS

Sukhotin et al., "Photomixing and photoconductor measurements on ErAs/InGaAs at 1.55 μm", Applied Physics Letters, vol. 82, No. 18, May 5, 2003, pp. 3116-3118.
Sun et al., "Room Temperature GaN/AlGaN Self-Mixing Terahertz Detector Enhanced by Resonant Antennas", Applied Physics Letters, American Institute of Physics, vol. 98, No. 25, Jun. 20, 2011, pp. 252103-1-252103-3.
Suzuki et al., "Fe-implanted InGaAs terahertz emitters for 1.56 μm wavelength excitation", Applied Physics Letters, vol. 86, No. 051104, 2005, pp. 051104-1-051104-3.
Takazato et al., "Detection of terahertz waves using low-temperature-grown InGaAs with 1.56 μm pulse excitation", Applied Physics Letters, vol. 90, No. 101119, 2007, pp. 101119-1-1011119-3.
Tanigawa et al., "Enhanced Responsivity in a Novel AlGaN/GaN Plasmon-Resonant Terahertz Detector Using Gate-Dipole Antenna with Parasitic Elements", 68th Device Research Conference, Jun. 21-23, 2010, pp. 167-168.
Taylor et al., "Resonant-optical-cavity photoconductive switch with 0.5% conversion efficiency and 1.0 W peak power", Optics Letters, vol. 31, No. 11, Jun. 1, 2006, pp. 1729-1731.
Tsuda et al., "Application of Plasmon-Resonant Microchip Emitters to Broadband Terahertz Spectroscopic Measurement", Journal of the Optical Society of America B, vol. 26, No. 9, Sep. 2009, pp. A52-A57.
Wang et al., "Plasmonic photoconductive detectors for enhanced terahertz detection sensitivity", Optical Society of America, Optics Express, vol. 21, No. 14, Jul. 15, 2013, pp. 17221-17227.
Yang et al., "Enhanced light-matter interaction at nanoscale by utilizing high-aspect-ratio metallic gratings", Optics Letters, vol. 38, No. 18, Sep. 15, 2013, pp. 3677-3679.
European Examination Report Corresponding to EP Application No. 13741491.8, dated Oct. 21, 2015, 5 Pages.
Extended European Search Report for European Application No. 15807544.0, Search completed Jun. 12, 2018, and dated Jun. 20, 2018, 8 Pgs.
International Preliminary Report on Patentability for International Application PCT/US2013/022776, Report issued Jul. 29, 2014, dated Aug. 7, 2014, 7 pgs.
International Preliminary Report on Patentability for International Application PCT/US2014/049866, Report issued Feb. 9, 2016, dated Feb. 18, 2016, 7 Pgs.
International Preliminary Report on Patentability for International Application PCT/US2015/035685, Report issued Dec. 15, 2016, dated Dec. 22, 2016, 6 pgs.
International Preliminary Report on Patentability for International Application PCT/US2018/028579, Report issued Oct. 22, 2019, dated Oct. 31, 2019, 7 Pgs.
International Search Report and Written Opinion for International Application PCT/US2015/035685, Report Completed Aug. 27, 2015, dated Aug. 27, 2015, 8 Pgs.
International Search Report and Written Opinion for International Application No. PCT/US2013/022776, Search completed May 15, 2013, dated May 16, 2013, 9 Pgs.
International Search Report and Written Opinion for International Application No. PCT/US2014/049866, Search completed Nov. 19, 2014, dated Nov. 20, 2014, 9 Pgs.
International Search Report and Written Opinion for International Application No. PCT/US2018/028579, Search completed Jul. 5, 2018, dated Jul. 20, 2018, 11 Pgs.

Supplementary European Search Report for European Application No. 13741491.8, Search completed Sep. 28, 2015, dated Oct. 12, 2015, 6 pgs.
Berry et al., "Design, Fabrication, and Experimental Characterization of Plasmonic Photoconductive Terahertz Emitters", Journal of Visualized Experiments, vol. 77, No. e50517, Jul. 2013, pp. 1-8.
Berry et al., "Generation of high power pulsed terahertz radiation using a plasmonic photoconductive emitter array with logarithmic spiral antennas", Applied Physics Letters, 2014, vol. 104, 081122, pp. 081122-1-081122-4.
Berry et al., "High Power Terahertz Generation Using 1550 nm Plasmonic Photomixers", Applied Physics Letters, vol. 105, 2014, Published online Jul. 2014, pp. 011121-1-011121-4.
Berry et al., "Nanoscale Contact Electrodes for Significant Radiation Power Enhancement in Photoconductive Terahertz Emitters", 2013 IEEE MTT-S International Microwave Symposium Digest (MTT), Jun. 2-7, 2013, 4 pgs.
Berry et al., "Plasmonic photomixers for increased terahertz radiation powers at 1550 nm optical pump wavelength", IEEE, 2014, 3 pgs.
Berry et al., "Plasmonically-Enhanced Localization of Light into Photoconductive Antennas", IEEE 2010 Conference on Lasers and Electro-Optics (CLEO) and Quantum Electronics and Laser Science Conference (QELS), May 16-21, 2010, 2 pgs.
Berry et al., "Plasmonics Enhanced Photomixing for Generating Quasi-Continuous-Wave Frequency-Tunable Terahertz Radiation", Optics Letters, vol. 39, No. 15, Aug. 1, 2014, pp. 4522-4524.
Berry et al., "Principles of Impedance Matching in Photoconductive Antennas", Journal of Infrared, Millimeter and Terahertz Waves, vol. 33, No. 12, published online Sep. 27, 2012, pp. 1182-1189, doi: 10.1007/s10762-012-9937-3.
Berry et al., "Significant performance enhancement in photoconductive terahertz optoelectronics by incorporating plasmonic contact electrodes", Nature Communications, vol. 4, No. 1622, Mar. 27, 2013, 10 pgs.
Berry et al., "Terahertz generation using plasmonic photoconductive gratings", New Journal of Physics, vol. 14, 2012, 12 pgs.
Berry et al., "Ultrafast Photoconductors based on Plasmonic Gratings", IEEE 2011 36th International Conference on Infrared, Millimeter, and Terahertz Waves (IRMMW-THz), Oct. 2-7, 2011, 2 pgs.
Bjarnason et al., "ErAs: GaAs photomixer with two-decade tunability and 12 μW peak output power", Applied Physics Letters, vol. 85, No. 18, Nov. 1, 2004, pp. 3983-3985.
Brown et al., "Characterization of a Planar Self-Complementary Square-Spiral Antenna in the THz Region", Microwave and Optical Technology Letters, vol. 48, No. 3, Mar. 2006, pp. 524-529.
Brown et al., "Coherent millimeter-wave generation by heterodyne conversion in low-temperature-grown GaAs photoconductors", Journal of Applied Physics, Feb. 1, 1993, vol. 73, No. 3, pp. 1480-1484.
Catrysse et al., "Guided modes supported by plasmonic films with a periodic arrangement of subwavelength slits", Applied Physics Letters, vol. 88, 2006, pp. 031101-1-031101-3.
Chimot et al., "Photomixing at 1.55 μm in ion-irradiated In0.53GA. 47As on InP", Optics Express, vol. 14, No. 4, Mar. 6, 2006, pp. 1856-1861.
Extended European Search Report for European Application No. 18787213.0, Search completed Nov. 30, 2020, dated Dec. 9, 2020, 7 Pgs.

* cited by examiner

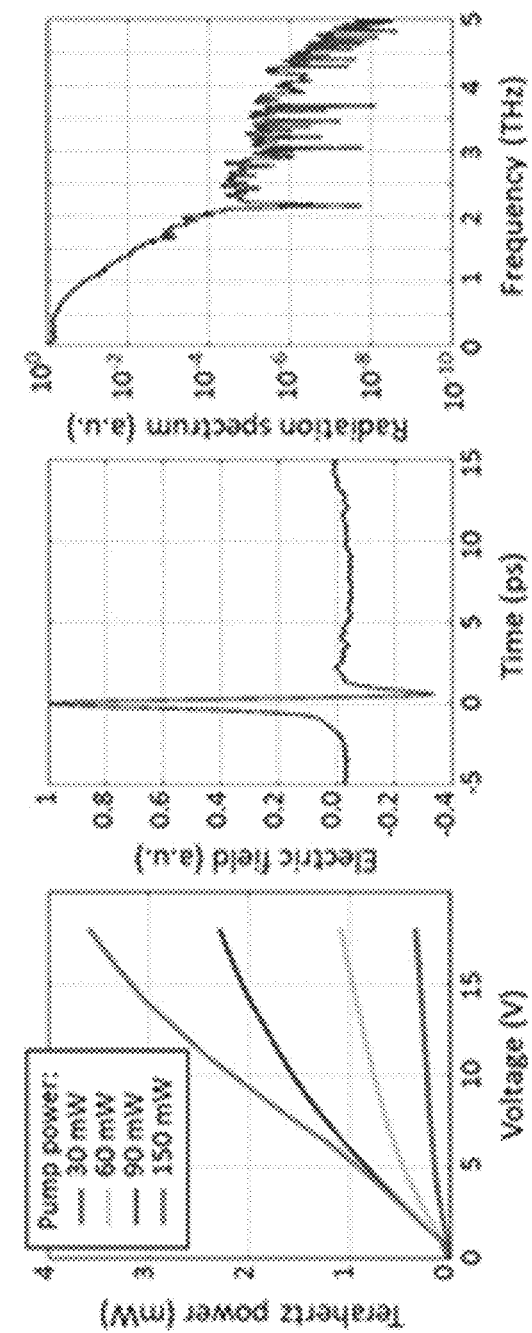
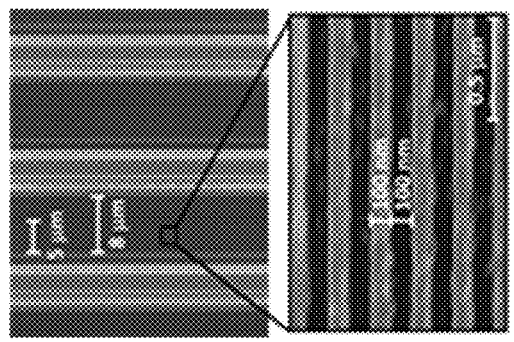
FIG. 5d  FIG. 5c  FIG. 5b  FIG. 5a

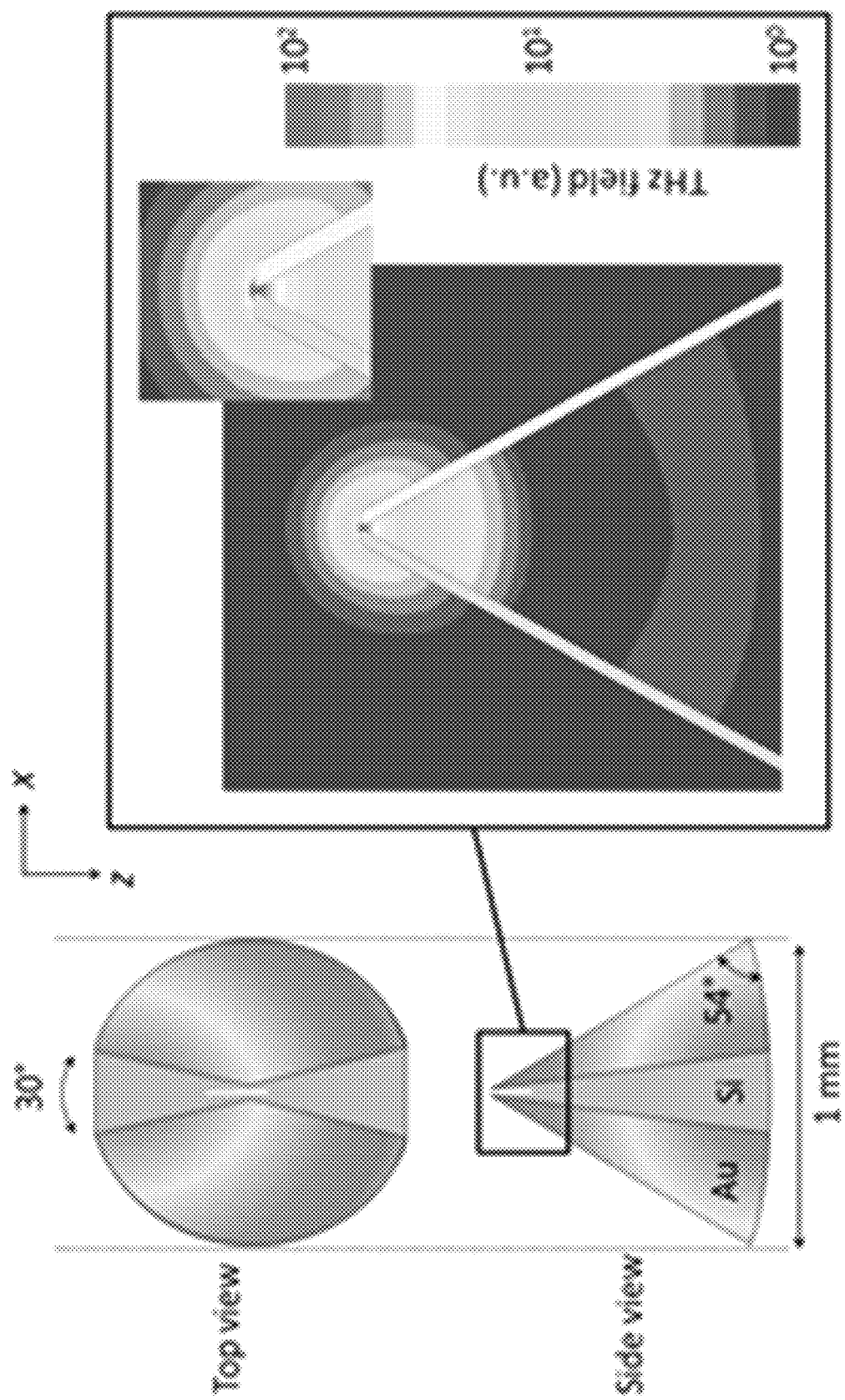

FIG. 6

Top and side views of an exemplary curved tapered parallel plate waveguide with a metal plate coverage of 83% are shown on the left. The electric field profile at the 100 nm-wide waveguide tip at 1 THz, estimated by COMSOL simulations, is shown on the right. For this analysis, an x-polarized input beam is considered to be coupled from the waveguide facet with a maximum metal spacing of 1 mm.

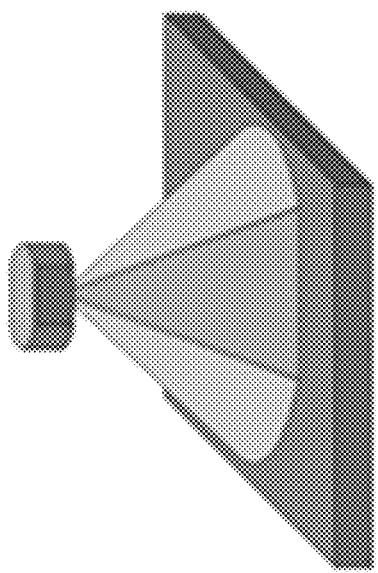
FIG. 7c
(c) Si etching with KOH
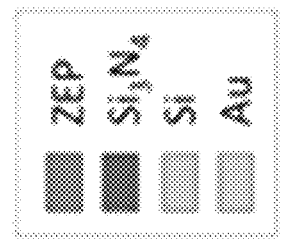
ZEP
Si₃N₄
Si
Au
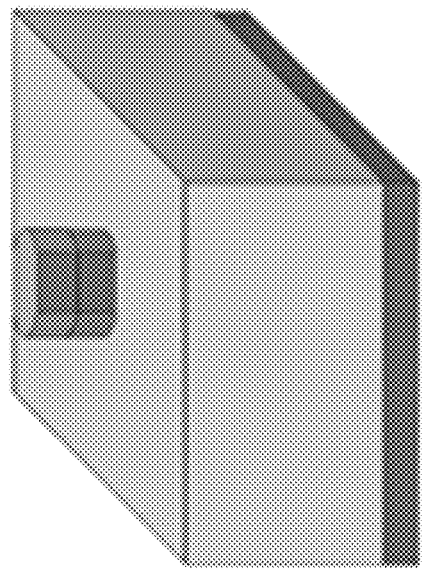
FIG. 07b
(b) Si₃N₄ etching
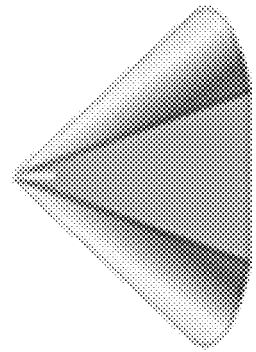
FIG. 7e
(e) Side evaporation of Au
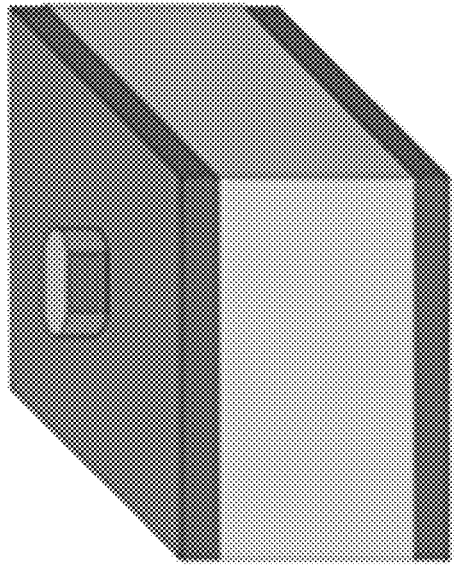
FIG. 7a
(a) EBL exposure
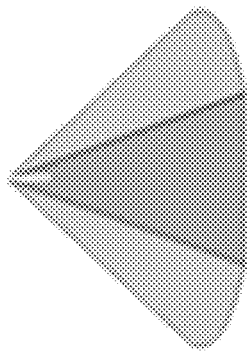
FIG. 7d
(d) Si₃N₄ etching and gap milling

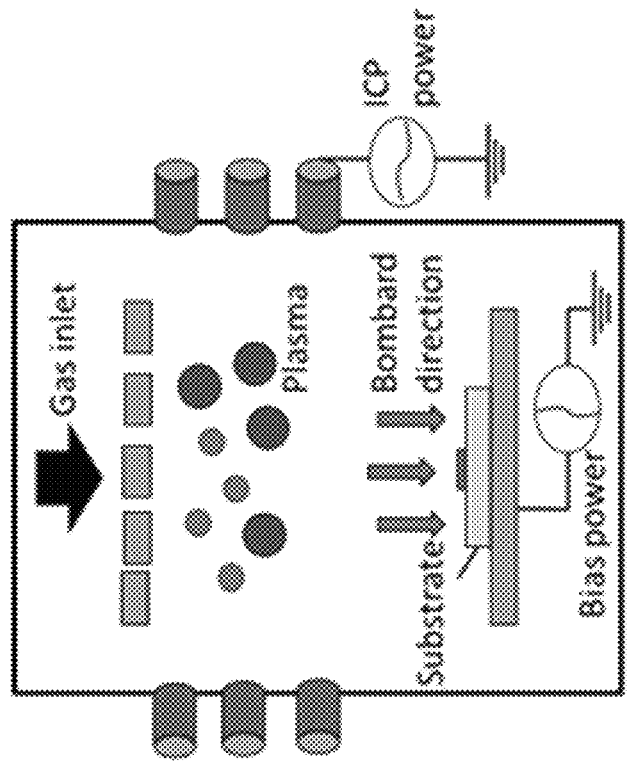
FIG. 8c
(c) ICP etching
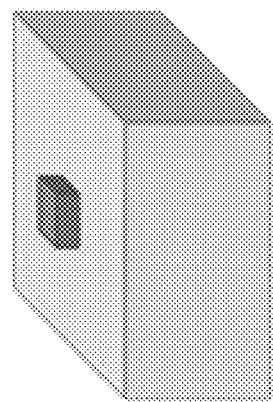
FIG. 8b
(b) Pattern the mask layer
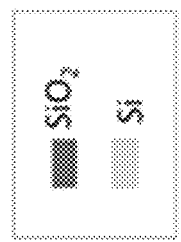
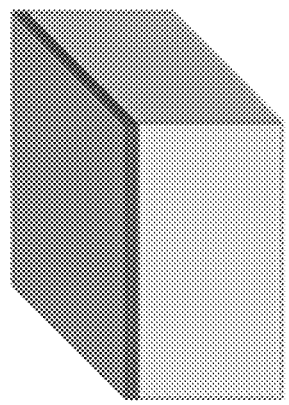
FIG. 8a
(a) Deposit mask layer on silicon substrate
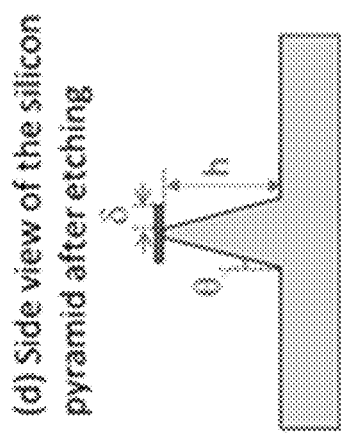
(d) Side view of the silicon pyramid after etching
FIG. 8d (c) Control tapered shape by moving the substrate during plating (b) Electroplating (a) Pattern metal on a substrate as seed layer

SYSTEMS AND METHODS FOR HIGH FREQUENCY NANOSCOPY

CROSS-REFERENE TO RELATED APPLICATIONS

This application is a U.S. national phase of PCT Application No. PCT/US2018/028579, entitled "Systems and Methods for High Frequency Nanoscopy" to Jarrahi et al., filed Apr. 20, 2018, which claims priority to U.S. Provisional Patent Application No. 62/487,974, entitled "Scanning Terahertz Nanoscopy Probe" to Jarrahi et al., filed on Apr. 20, 2017, the disclosures of which are incorporated herein by reference in their entirety.

FIELD OF THE INVENTION

The present invention generally relates terahertz spectroscopy systems and more specifically to systems and methods for high frequency scanning nanoscopy.

BACKGROUND

Microscopy is the technical field of using microscopes to view objects and areas of objects that cannot be seen with the naked eye (objects that are not within the resolution range of the normal eye). Various microscopy techniques have been used including Scanning Tunneling Microscopy and other follow up techniques such as Atomic Force Microscopy, Scanning Optical Microscopy, and Electron Microscopy. However, their spectral and operational constraints have limited their use for studying dynamics of biological processes. Alternative single-molecule approaches have used various labeling techniques (e.g. fluorescent labeling) for characterizing structural dynamics of biomolecules. However, labeling biomolecules near their active sites can be a major challenge and can affect the natural behavior of molecules in many biological processes.

In physics, terahertz time-domain spectroscopy (THz-TDS) is a spectroscopic technique in which the properties of matter are probed with short pulses of terahertz radiation. The generation and detection scheme is sensitive to the sample's effect on both the amplitude and the phase of the terahertz radiation. Terahertz spectroscopy may also detect and control the properties of matter with electromagnetic fields that are in the frequency range between a few hundred gigahertz and several terahertz (abbreviated as THz).

SUMMARY OF THE INVENTION

Systems and methods for high frequency nanoscopy in accordance with embodiments of the invention are disclosed. An embodiment includes a method of manufacturing a high frequency nanoscope, the method including: fabricating a tapered waveguide probe with at least partial metal coverage on several sidewalls, where the tapered waveguide probe includes an input facet and a tip; packaging the tapered waveguide probe with at least one optically pumped source and at least one optically probed detector so that the at least one optically pumped source and the at least one optically probed detector are packaged over the input facet of the tapered waveguide probe; where the at least one optically pumped source is configured for beam generation; and where the at least one optically probed detector is configured for beam detection; and where the tapered waveguide probe is configured for focusing a generated beam from the at least one optically pumped source onto a sample under test and coupling the reflected beam from the sample under test to the at least one optically pumped detector for detection.

In a further embodiment, the at least one optically pumped source is selected from the group consisting of a photoconductive terahertz source and a nonlinear optical source.

In another embodiment, the at least one optically probed detector is selected from the group consisting of a photoconductive terahertz detector and a nonlinear optical terahertz detector.

In a still further embodiment, the tip of the tapered waveguide probe has a cross-section that is less than 100 micrometers across.

In still another embodiment, the high frequency nanoscope is in the terahertz range.

In a yet further embodiment, a frequency range of the high frequency nanospcope is above 1 gigahertz (GHz).

In yet another embodiment, fabricating the tapered waveguide probe includes using an etching process to etch a substrate.

In a further embodiment again, the etching process is selected from the group consisting of a wet etching process and a dry etching process.

In another embodiment again, the etching process includes using a combination of dry etching and wet etching.

In a further additional embodiment, the etching process includes using inductively coupled plasma (ICP) etching and potassium hydroxide (KOH) etching.

In another additional embodiment, fabricating the tapered waveguide probe includes: providing a silicon (Si) substrate coated with at least one mask layer selected from the group consisting of a silicon nitride ($Si_3N_4$) and a silicon dioxide ($SiO_2$) on both sides of the Si substrate; spin coating a resist on a first side of the Si substrate, wherein the resist is selected from the group consisting of an electron beam resist and a photoresist; and patterning the resist to form a shape through at least one lithography technique selected from the group consisting of electron beam lithography and photolithography.

In a still further embodiment, the method further includes: transferring the pattern to the at least one mask layer by reactive ion etching to serve as an etch mask, and etch the Si substrate using a potassium hydroxide (KOH) bath, where a KOH etching duration is adjusted to allow an under-etch below the at least one mask layer.

In still yet another embodiment, the method includes removing the remaining the at least one mask layer using wet etching; milling a slit on a top of the Si substrate using a focused ion beam; and evaporating metal from sides of the Si substrate to cover the sidewalls.

In a still further additional embodiment, the method includes: depositing the at least partial metal coverage on the several sidewalls; and using a focused ion beam to remove at least a portion of the metal from the several sidewalls and the tip.

In still another additional embodiment, fabricating the tapered waveguide probe includes using a dry etching processes using an inductively coupled plasma (ICP) etcher.

In a yet further embodiment again, fabricating the tapered waveguide probe includes: depositing a mask layer on a silicon (Si) substrate; and generating a pattern using at least technique selected from the group consisting of photolithography and electron beam lithography.

In yet another embodiment again, the mask layer is selected from the group consisting of silicon dioxide ($SiO_2$), chromium, and chromium/gold.

In a yet further additional embodiment, the method includes: processing the Si substrate in an ICP etcher, where the ICP etcher generates plasma through inductive couple of RF power; and applying bias to etch the Si substrate.

In yet another additional embodiment, the method includes using potassium hydroxide (KOH) wet etching.

In a further additional embodiment again, a tapering angle of the tapered waveguide probe is adjusted by controlling at least one ICP parameter, where the at least one ICP parameter is selected from the group consisting of gas flow, pressure, plasma density, and RF/DC power.

In another additional embodiment again, fabricating the tapered waveguide probe includes using thermal pulling.

In a still further embodiment again, fabricating the tapered waveguide probe includes using electroplating.

In another further embodiment, fabricating the tapered waveguide probe further includes patterning a metal layer on a substrate as a seed layer.

In still yet another embodiment again, the substrate is non-conductive and is compatible with chemicals in a plating bath.

In a still yet further additional embodiment the substrate is selected from the group consisting of silicon, glass, and plastics.

In still yet another additional embodiment, fabricating the tapered waveguide probe further includes: soaking the substrate with the patterned metal layer, as cathode, and an anode electrode in a plating bath, where the substrate is mounted on a moving stage which gradually pulls the substrate out of the plating bath during plating.

In a yet further additional embodiment again adjusting a current of a power supply and a moving speed of the substrate controls a tapering angle of the tapered waveguide probe.

In yet another additional embodiment again, the at least one optically pumped source and the at least one optically probed detector are mounted on a larger cross section side of the tapered waveguide probe.

In a still yet further additional embodiment again, the method further includes mounting the tapered waveguide probe on a XYZ translation stage with nanoscale axis control.

In another embodiment, a terahertz spectroscopy system includes: at least one optically pumped terahertz source for terahertz wave generation; at least one optically probed terahertz detector for terahertz detection; a femtosecond laser configured to pump the at least one terahertz source and probe the at least one terahertz detector, wherein there is a controllable time delay between pump and probe beams; a terahertz probe comprising an embedded tapered waveguide with partial metallic sidewall coverage capable of focusing a generated beam onto a sample under test and coupling the reflected beam from the sample under test to the terahertz detector for detection.

In a further embodiment, the at least one optically pumped terahertz source is selected from the group consisting of a photoconductive terahertz source and a nonlinear optical source.

In another embodiment, the at least one optically pumped terahertz source is a large area plasmonic photoconductive terahertz source.

In a still further embodiment, the large area plasmonic photoconductive terahertz source incorporates several plasmonic contact electrodes within an active area of the large area plasmonic photoconductive terahertz source.

In still another embodiment, the plasmonic contact electrodes utilize high-aspect ratio plasmonic contact electrode gratings.

In a yet further embodiment, the active area includes a set of interdigitated bias lines, wherein the several plasmonic contact electrode gratings are connected to anode bias lines of the photoconductive terahertz source within every other gap between the anode and cathode bias lines, where the other gaps between the anode and cathode bias lines are shadowed by a metal layer deposited on top of a $Si_3N_4$ antireflection coating to block light transmission in a substrate and induce a unidirectional dipole moment in the substrate.

In a yet further embodiment, the at least one optically pumped terahertz source is on an ErAs:InGaAs substrate.

In yet another embodiment, the at least one optically probed terahertz detector is selected from the group consisting of a photoconductive terahertz detector and a nonlinear optical terahertz detector.

In a further embodiment again, the at least one optically probed terahertz detector is a nonlinear electro-optic crystal.

In another embodiment again, the nonlinear electro-optic crystal is a ZnTe electro-optic crystal including an antireflection (AR) coating on a front side of the ZnTe electro-optic crystal and a high reflectivity (HR) coating on a backside of the ZnTe electro-optic crystal.

In a further additional embodiment, the AR coating includes a quarter-wave $Si_3N_4$ layer and the HR coating includes a heavily doped polysilicon film.

In another additional embodiment, the femtosecond laser is a phase-modulated dual-laser-synchronized control femtosecond laser.

In a still yet further embodiment, the embedded tapered waveguide includes a Si-core.

In still yet another embodiment, a first end of the embedded tapered waveguide matches a size of the at least one optically pumped terahertz source together with the at least one optically prospered terahertz detector and a second end of the embedded tapered waveguide has nanoscale dimensions.

In another additional embodiment, the embedded tapered waveguide is selected from the group consisting of a curved tapered parallel plate waveguide with an ellipse-shaped waveguide cross section, a tapered coaxial waveguide, and a tapered pyramid waveguide.

In a still further embodiment, the embedded tapered waveguide includes a curved tapered parallel plate waveguide with an ellipse-shaped waveguide cross section.

In still yet another embodiment, the embedded tapered waveguide has nanoscale dimensions.

In still another embodiment again, the at least one optically pumped terahertz source is mounted on a top surface of the terahertz probe such that a linearly polarized generated terahertz field is oriented in the same direction as that of transverse electromagnetic mode (TEM) mode of the embedded tapered waveguide.

In still a further additional embodiment, the spectroscopy system includes an indium tin oxide (ITO) coated glass slide, where the sample is placed on the ITO coated glass slide.

In a yet further embodiment again, a thickness and coating type of the at least one optically probed terahertz detector is selected such that the majority of a probe beam is coupled back to an original probe fiber after a double pass through the at least one optically probed terahertz detector.

BRIEF DESCRIPTION OF THE DRAWINGS

FIG. 5a illustrates SEM images of a fabricated large area plasmonic photoconductive source with plasmonic contact electrode gratings (200 nm pitch and 100 nm metal) in accordance with an embodiment of the invention.

FIG. 5b illustrates radiated power from a large area plasmonic photoconductive source as a function of bias voltage and pump power level ($\lambda$=800 nm) in accordance with an embodiment of the invention.

FIG. 5c illustrates measured radiated field in the time domain of a fabricated large area plasmonic photoconductive source at 50 mW optical pump power in accordance with an embodiment of the invention.

FIG. 5d illustrates radiated power in the frequency domain for a fabricated large area plasmonic photoconductive source at 50 mW optical pump power in accordance with an embodiment of the invention.

FIG. 6 illustrates top and side views of an exemplary curved tapered parallel plate waveguide with a metal plate coverage of 83% and the electric field profile at the 100 nm-wide waveguide tip at 1 THz, estimated by COMSOL simulations, in accordance with an embodiment of the invention.

FIGS. 7a-7e illustrate a process for fabricating a curved tapered parallel waveguide in accordance with an embodiment of the invention.

FIGS. 8a-8d illustrate a fabrication process for realizing a tapered waveguide terahertz probe using IC etching in accordance with an embodiment of the invention.

DETAILED DESCRIPTION

Figure 1:
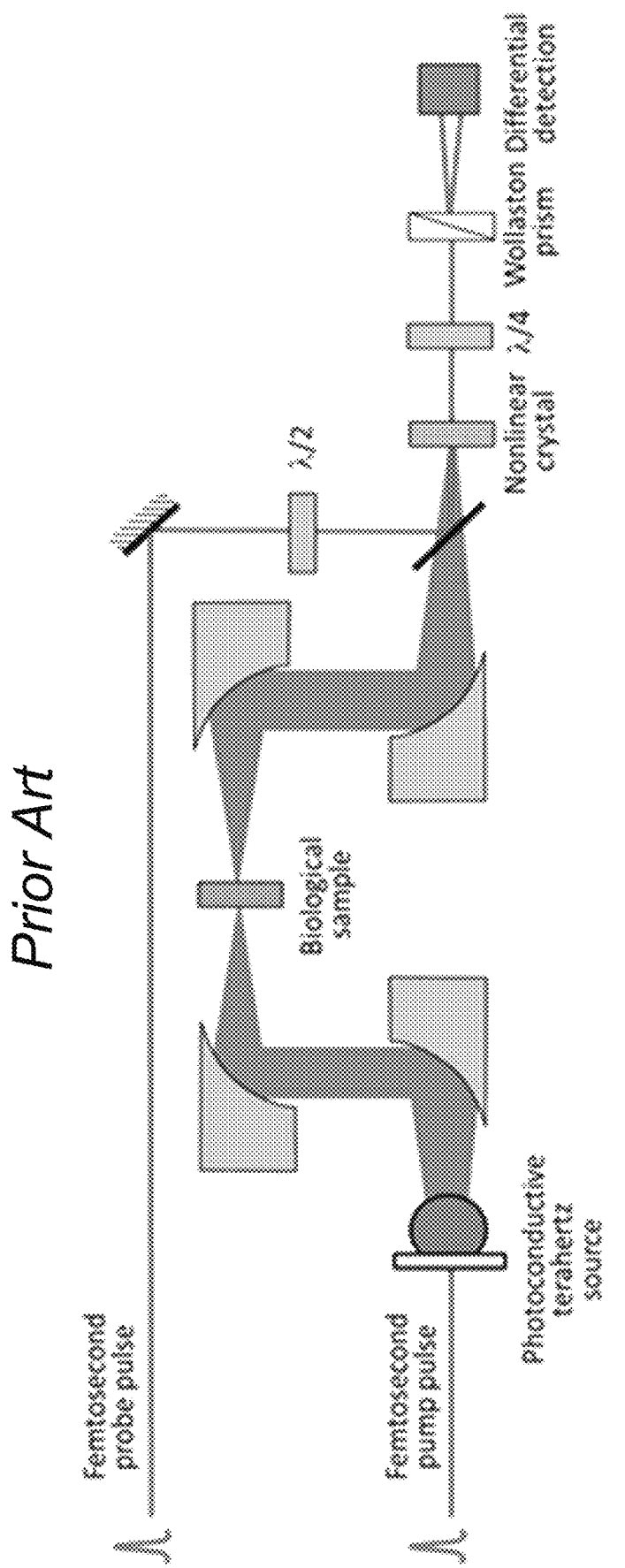
FIG. 1 illustrates a schematic diagram of a commonly used time-domain terahertz spectroscopy system for biological studies in transmission mode.

Turning now to the drawings, systems and methods for terahertz spectroscopy in accordance with various embodiments of the invention are illustrated. In particular, many embodiments provide a terahertz spectroscopy system that may be used in a variety of applications including (but not limited to) as a tool for label-free biological studies, thereby enhancing how research is conducted in biophysics. Many embodiments provide a label-free terahertz spectroscopy probing system that can be used for the study of the complex behaviors of biomolecules under native conditions, while avoiding exhaustive genetic and biochemical characterization of labeling reaction. In particular, many embodiments provide a time-domain terahertz spectroscopy system based on a high-performance terahertz source and detector integrated with a nanoscale terahertz probe for terahertz spectroscopy at the nanoscale with more than 2-3 orders of magnitude higher SNRs (sensitivities) compared to many existing technologies. Although much of the discussion below is with respect to spectroscopy systems at terahertz frequencies, the spectroscopy system in accordance with many embodiments may also allow operation at millimeter-wave, microwave, and radio frequencies, among various other frequencies appropriate to the requirements of specific applications in accordance with various embodiments of the invention.

Terahertz technology can offer unprecedented complementary functionalities and information for characterization of biomolecules and studying the structure, dynamics and operation of biological systems. This is because terahertz photon energies are comparable with the low binding energies of molecules inside heavy biomolecules, offering a platform for differentiating proteins and providing information about their conformation states through terahertz spectroscopy. Additionally, since distinct terahertz signatures of biomolecules are dependent on their intermolecular and intramolecular vibrations and rotations, terahertz spectroscopy enables investigating living cells and their interaction inside various biological systems including cell metabolism and reproduction as well as chemical transfer from the environment to a cell through the cell membrane and possible conformational changes. Moreover, since terahertz spectroscopy can capture femtosecond-scale dynamic variations, it is very well suited for investigating kinetics of molecular motions during protein rearrangement, folding, and binding to other biomolecules. Furthermore, terahertz waves are very sensitive probes of water, which has a significant influence on the behavior of biomolecules in biological systems.

Unique functionalities of terahertz waves have been utilized for a number of biological studies, including observing the binding between avidin and biotin in a membrane lipid-like environment, distinguishing between normal and cancerous cells, recognizing specific sequences of DNA at a femtomolar detection level, label-free observation of a ligand-analyte interaction, label-free DNA sequencing and detection of single-base mutation, label-free detection of proteins and antigen-antibody reactions, sensing nano-scale changes in living cell monolayers, and differentiating between bacterial spores. Apart from their capability for detecting biomolecules and monitoring their interaction with their environment, terahertz waves have also exhibited potentials for manipulating cellular functions and influencing biological processes in spite of their non-ionizing radiation. This capability is associated with the terahertz photon energies being at similar energy levels as biomolecule binding energies. In this regard, enhanced cell growth rates, morphological and membrane potential changes in neurons, and increased genomic instability in human lymphocytes have been reported in the presence of terahertz radiation at specific spectral ranges.

Despite its great promises, the scope and potential use of terahertz technology for biological studies is often limited by attributes of existing terahertz spectroscopy systems, namely low sensitivity and limited spatial resolution. Time-domain terahertz spectroscopy has been the most promising platform for biological studies since it is not impacted by the variations and limitations associated with cryogenic cooling of Fourier Transform Infrared Spectroscopy (FTIR). FIG. 1 illustrates a schematic diagram and operation concept of a widely used time-domain terahertz spectroscopy system for biological studies in transmission mode. The system illustrated in FIG. 1 is discussed in detail in U.S. Provisional Patent Application Ser. No. 62/487,974, entitled "Scanning Terahertz Nanoscopy Probe", filed Apr. 20, 2017, the disclosure of which, including the relevant disclosure describing the system illustrated in FIG. 1, is incorporated herein by reference in its entirety Although the time-domain terahertz spectroscopy system illustrated in FIG. 1 has been very instrumental in revealing many unique functionalities of terahertz waves for biological studies, its scope and potential use is still limited by two major factors. The first limitation concerns the spectroscopy sensitivity constraints of the existing time-domain terahertz spectroscopy systems, limited by the attenuation of biological samples, low output terahertz power of terahertz sources and low detection sensitivity of terahertz detectors. Since water has strong spectral absorption lines in the terahertz frequency spectrum, most successful biological studies in the terahertz frequency range have utilized frozen, dry, or low water content samples. However, the crucial influence of water molecules in the dynamics and behavior of biological systems necessitates new high sensitivity terahertz spectroscopy systems that can accurately distinguish between the spectral signatures of the biological samples and water molecules with a highly absorptive water background. There have been several attempts to enhance the sensitivity of time-domain terahertz spectroscopy systems by introducing multiple terahertz beam passes through the sample or enhancing terahertz wave interaction with biological samples placed inside a metamaterial, transmission line, or waveguide structure. However, these techniques introduce limitations in the spectral range of the terahertz spectroscopy system and/or pose practical limitations to the scope of their potential use for biological studies in many biological systems that require specific environmental conditions. The second limitation concerns the spatial resolution of existing time-domain terahertz spectroscopy systems, which is due to the diffraction limited focus of long-wavelength terahertz waves. There have been several attempts to extend the spatial resolution of time-domain terahertz spectroscopy systems to the nanoscale by the use of atomic force microscopy (AFM) tips, nanoscale apertures, and other near field techniques. However, the severe tradeoff between the sensitivity and spatial resolution of the demonstrated techniques has still limited the potential use of such terahertz spectroscopy systems for many biological studies in realistic environments. Accordingly, terahertz spectroscopy systems in accordance with many embodiments of the invention address these major challenges of the existing terahertz spectroscopy systems for biological studies by providing a time-domain terahertz spectroscopy system based on a high-performance terahertz source and detector integrated with a nanoscale terahertz probe for terahertz spectroscopy at the nanoscale. In a number of embodiments, sensitivities with more than 2-3 orders of magnitude higher SNRs compared to existing technologies can be achieved.

Accordingly, many embodiments provide a terahertz spectroscopy system for biological studies at the nanoscale, while offering significantly higher sensitivities compared to existing terahertz spectroscopy systems. Many embodiments provide a time-domain terahertz spectroscopy system based on a high-performance terahertz source and detector integrated with a terahertz probe having specific characteristics. In several embodiments, the terahertz probe can include an embedded curved tapered parallel plate waveguide with a circular-shaped waveguide cross section, which may be used for focusing the generated terahertz beam onto the biological sample with nanoscale focus dimensions and coupling the reflected terahertz beam from the sample to the terahertz detector for detection.

Several embodiments of the terahertz spectroscopy system may use different types of optically pumped terahertz sources (e.g. photoconductive terahertz sources and sources operating based on nonlinear optical phenomena) as appropriate to the requirements of specific applications. Certain embodiments of the terahertz spectroscopy system may use large area plasmonic photoconductive sources, which may offer 2-3 orders of magnitude higher optical-to-terahertz conversion efficiencies and terahertz radiation powers compared to many existing sub-picosecond terahertz radiation sources, enabling significantly higher SNRs compared to the state of the art terahertz spectroscopy systems.

Accordingly, many embodiments of the nanoscale terahertz probe of the terahertz spectroscopy system allow terahertz spectroscopy at the nanoscale without a considerable impact on the spectral bandwidth and the incident terahertz power of the terahertz spectroscopy system, while enhancing the SNR of the spectroscopy system significantly by focusing the incident terahertz radiation from millimeter-scale to nanoscale dimensions. Certain embodiments of the terahertz spectroscopy system may use curved tapered parallel plate waveguides with a circular-shaped waveguide cross section. However, other types of tapered waveguides including tapered coaxial waveguide and tapered pyramid waveguides with square, pentagon, hexagon, heptagon, octagon, and/or other polygons with different metal coverage percentages, among others can be used as appropriate to the requirements of specific applications in accordance with many embodiments of the invention.

Several embodiments of the terahertz spectroscopy system may use different types of optically pumped terahertz detectors, including photoconductive terahertz detectors and detectors operating based on nonlinear optical phenomena as appropriate to the requirements of specific applications in accordance with embodiments of the invention. In particular, several embodiments of the terahertz spectroscopy systems may use two different terahertz detectors, a large area plasmonic photoconductive detector and a nonlinear electro-optic crystal.

Certain embodiments of the terahertz spectroscopy system offer significant flexibility for biological studies in practical settings (e.g., flexibility in large area scanning, simultaneous optical microscopy, and adding external chemical, electrical, optical, mechanical, and thermal stimuli) through a fully packaged terahertz probe with system components and a fiber-coupled terahertz generation/detection setup.

Figure 2:
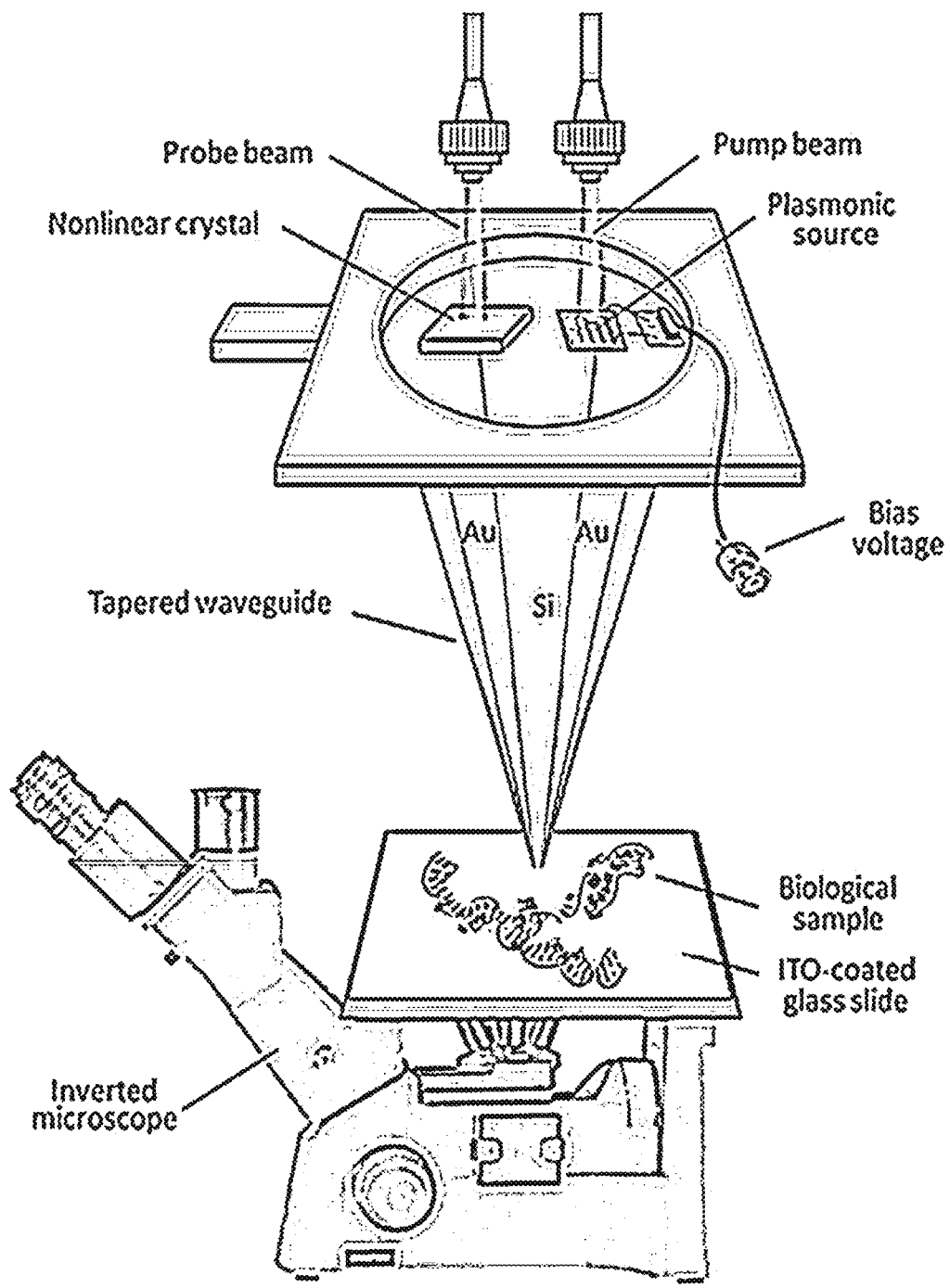
FIG. 2 illustrates a schematic diagram and operation concept of a time-domain terahertz spectroscopy system in accordance with an embodiment of the invention.

FIG. 2 illustrates a schematic diagram and operation concept of a time-domain terahertz spectroscopy system in accordance with an embodiment of the invention. As illustrated in FIG. 2, the terahertz spectroscopy system includes a large area plasmonic photoconductive terahertz source for terahertz wave generation and a nonlinear electro-optic crystal for terahertz detection. Femtosecond optical pulses from a phase-modulated dual-laser-synchronized control femtosecond laser ($\lambda \approx 1550$ nm) may be used to pump/probe the plasmonic terahertz source and the nonlinear electro-optic crystal. Two polarization maintaining fibers may be used to couple the pump and probe beams to the active area of the large area plasmonic photoconductive terahertz source and the nonlinear electro-optic crystal, respectively. Many embodiments may select a 1550 nm optical wavelength for the terahertz spectroscopy system mainly because of access to available phase-modulated dual-femtosecond-laser systems which operate at 1550 nm wavelength range, as well as availability of low dispersion, polarization maintaining fibers and a large number of fiber optic components that may be used during terahertz detection stages. In many embodiments, a nanoscale terahertz probe with an embedded curved tapered parallel plate waveguide with a Si-core medium may be used to focus the generated terahertz beam onto the biological sample under test with nanoscale focus dimensions and couple the reflected terahertz beam from the sample to the nonlinear electro-optic crystal for detection. For this purpose, one end of the curved tapered parallel plate waveguide may be designed to match the size of the plasmonic terahertz source together with the nonlinear electro-optic crystal and the other end of the curved tapered parallel plate waveguide may be designed to have nanoscale dimensions. The spectroscopy setup can be placed on an inverted microscope to capture the optical image of the biological sample under test simultaneously by locating the tip of the nanoscale terahertz probe. In many embodiments, the spectroscopy process may start with an optical pump pulse train pumping the plasmonic terahertz source, generating a sub-picosecond terahertz pulse train. As explained in detail below, many embodiments of the terahertz spectroscopy system may use a plasmonic photoconductive terahertz source, which may offer 2-3 orders of magnitude higher optical-to-terahertz conversion efficiencies and terahertz radiation powers compared to existing sub-picosecond terahertz sources, enabling significantly higher spectroscopy sensitivities compared to the state of the art. In several embodiments, the generated terahertz beam may propagate along the curved tapered parallel plate waveguide and can be subsequently focused onto the sample under test. The plasmonic terahertz source may be mounted on the top surface of the terahertz probe such that the linearly polarized generated terahertz field is oriented in the same direction as that of the transverse electromagnetic mode (TEM) mode of the waveguide. This may allow low loss and broadband terahertz beam propagation through the TEM mode without experiencing considerable dispersion. As a result, the broad bandwidth of the generated terahertz beam can be maintained along the curved tapered parallel plate waveguide and when incident on the sample under test. Additionally, concentration of a large fraction of the generated terahertz power at the nanoscale end of the curved tapered parallel plate waveguide may offer further enhanced terahertz intensities incident on the sample under test, enabling high SNRs through the time-domain terahertz spectroscopy system. The reflected terahertz beam from the sample under test, which carries its terahertz spectral signatures, may then be coupled to the curved tapered parallel plate waveguide. The biological samples may be placed on an indium tin oxide (ITO) coated glass slide. In many embodiments, the use of ITO allows reflecting a large portion of the incident terahertz beam interacting with the biological sample back to the curved tapered waveguide and transmitting a large portion of the microscope optical beam through the sample under test simultaneously. In many embodiments, other coatings that are reflective at the relevant wavelength of the imaging source can also be used.

After propagating through the tapered parallel plate waveguide, the reflected terahertz beam may pass through the nonlinear crystal for electro-optic detection of the terahertz electric field. As explained in detail below, in many embodiments, the thickness and coating type of the nonlinear electro-optic crystal may be selected such that the majority of the optical probe beam is coupled back to the original probe fiber after a double pass through the nonlinear electro-optic crystal. The phase and polarization of the back-coupled portion of the optical probe beam can be modified according to the reflected terahertz electric field due to the Pockels effect in the nonlinear electro-optic crystal. The variations in the phase and polarization of the back-coupled optical probe beam can then be measured through additional polarization optics along the probe fiber path and the reflected terahertz field intensity may be retrieved accordingly. Similar to conventional time-domain terahertz spectroscopy systems, the time-domain terahertz electric field may be measured by varying the optical delay between the optical pump and probe pulses and the frequency-domain terahertz spectrum can be determined by calculating the Fourier transform of the measured time-domain terahertz field. Although FIG. 2 illustrates a particular terahertz spectroscopy system, many embodiments of the terahertz spectroscopy system may use other types of optically pumped terahertz sources and detectors, including photoconductive terahertz sources/detectors and sources/detectors operating based on nonlinear optical phenomena as appropriate to the requirements of specific applications in accordance with embodiments of the invention. Also, many embodiments of the terahertz spectroscopy system may use other types of tapered waveguides, including tapered coaxial waveguides and tapered pyramid waveguides with square, pentagon, hexagon, heptagon, octagon, and other polygons with different metal coverage percentages, among others as appropriate to the requirements of specific applications in accordance with embodiments of the invention.

Large Area Plasmonic Photoconductive Terahertz Sources

Many embodiments of the terahertz spectroscopy system use as a component a large area plasmonic photoconductive terahertz source. When the active area of a large area photoconductive source is illuminated by an optical pump beam, photo-generated electrons and holes can be accelerated in opposite directions by the external bias electric field. The acceleration and separation of the photo-carriers may induce a time-varying dipole moment within the device active area which may generate terahertz radiation. Large area photoconductive sources may be suitable for a terahertz spectroscopy system in accordance with several embodiments of the invention because: (1) they offer very broad radiation bandwidth, which may allow retrieving spectral signatures of biological samples over a broad frequency range, (2) they can operate at higher optical pump power levels and, thus, offer higher radiation powers compared to other types of sub-picosecond terahertz sources, which are limited by the carrier screening effect and thermal breakdown at higher optical pump powers, (3) they may not need a very sensitive optical alignment due to their relatively large active areas, simplifying device packaging with the optical pump fiber, and (4) they may not need a Si lens at the backside of the substrate for efficient extraction of the generated terahertz beam due to their directional radiation pattern and, therefore, can be directly mounted on the top surface of the nanoscale probe.

Figure 3A:
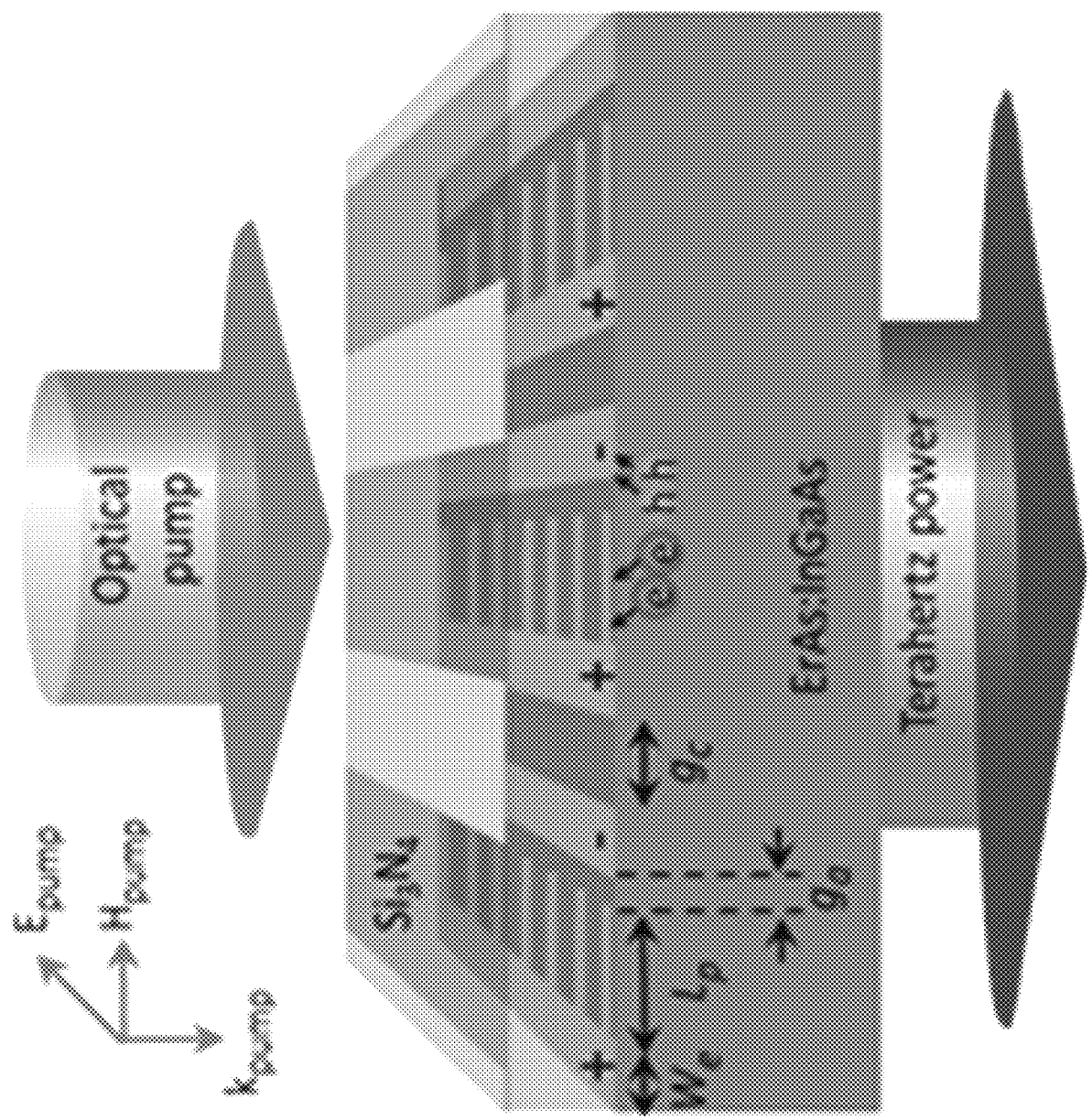
FIG. 3a illustrates a schematic diagram and operation concept of a large area plasmonic photoconductive terahertz source fabricated on an ErAs:InGaAs substrate in accordance with an embodiment of the invention.

Despite their great promise for high power terahertz generation (by accommodating high optical pump power levels), the output power of conventional large area photoconductive sources may be limited by the weak effective dipole moments induced within the device active area. To address this limitation, many embodiments of the terahertz spectroscopy system provide a design based on plasmonic contact electrodes. An example of a terahertz spectroscopy system with a design based on plasmonic contact electrodes in accordance with an embodiment of the invention is illustrated in FIG. 3a. Plasmonic contact electrodes may be effective in enhancing the radiation power of various photoconductive terahertz sources by reducing the transport path length of the photocarriers to the device contact electrodes. In several embodiments, by incorporating plasmonic contact electrodes within the active area of large area photoconductive sources, most of the photocarriers may be generated in close proximity to the contact electrodes. Therefore, the majority of the photocarriers may drift to the contact electrodes within a sub-picosecond time-scale. Since the contact electrodes may accommodate photocurrent propagation velocities much higher than that of semiconductor substrate, a much stronger time-varying dipole moment may be induced in response to an incident optical pump and, thus, greatly enhanced terahertz radiation power may be achieved compared to conventional large area photoconductive sources. In particular, FIG. 3a illustrates a large area plasmonic photoconductive source in accordance with an embodiment of the invention. In many embodiments, the device may be fabricated on an ErAs:InGaAs substrate, which can be used for operation at ~1550 nm optical pump wavelengths. ErAs:InGaAs can offer a short carrier lifetime for suppressing low-frequency photocurrents and a relatively large substrate resistivity for maintaining a high bias electric field across the device active area and low noise operation. Many embodiments may use ErAs:InGaAs substrates that have been epitaxially grown which may offer a carrier lifetime of 0.85 ps and substrate resistivity of ~1 KΩ.cm. In many embodiments, the device active area may include a set of interdigitated bias lines. Arrays of plasmonic contact electrode gratings can be connected to the anode bias lines of the photoconductive source within every other gap between the anode and cathode bias lines. The other gaps between the anode and cathode bias lines can be shadowed by a second metal layer deposited on top of a $Si_3N_4$ antireflection coating to block light transmission into the substrate and induce a unidirectional dipole moment in the substrate. The geometry of the plasmonic contact electrode gratings and the thickness of the $Si_3N_4$ antireflection coating can be chosen to transmit the majority of the incident optical pump photons through the plasmonic gratings into the ErAs:InGaAs substrate. Although FIG. 3a illustrates a particular large area plasmonic photoconductive source fabricated on an ErAs:InGaAs substrate any of a variety of plasmonic photoconductive sources fabricated on a variety of different substrates may be utilized as appropriate to the requirements of specific application in accordance with various embodiments of the invention.

Figure 3B:
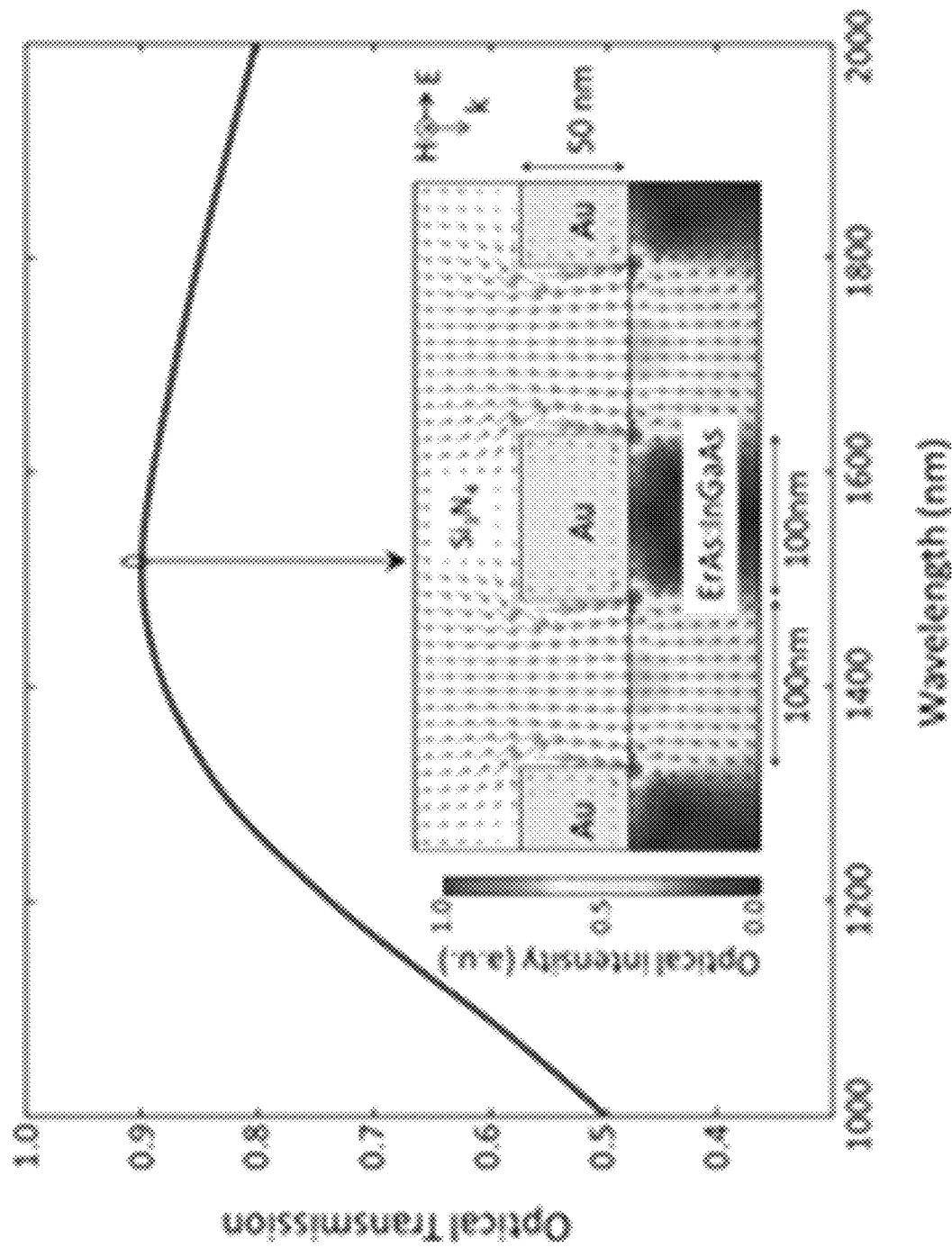
FIG. 3b illustrates power transmission of a TM-polarized optical pump beam into an ErAs:InGaAs substrate as a function of optical wavelength in accordance with an embodiment of the invention.

In many embodiments of the terahertz spectroscopy system, a finite-element solver (COMSOL) can be used to design plasmonic contact electrode gratings. A grating design for large area plasmonic photoconductive sources in accordance with an embodiment of the invention is illustrated in FIG. 3b. It consists of Au gratings with a 200 nm pitch, 100 nm metal width, and 50 nm metal height and a 250 nm thick $Si_3N_4$ antireflection coating, offering 90% optical transmission into the ErAs:InGaAs substrate at 1550 nm pump wavelength. Since transmission of the incident optical pump into the substrate can be through excitation of surface plasmon waves and through 100 nm gaps between the plasmonic grating fingers, a large portion of the photocarriers may be generated in close proximity to the plasmonic gratings. Therefore, a large portion of the photo-generated electrons may be drifted to the plasmonic gratings (anode contact electrodes) within a sub-picosecond timescale and radiate through the effective Hertzian dipole formed by the plasmonic gratings. The photocurrent propagation velocity along plasmonic gratings may not be limited by the carrier scattering inside the semiconductor substrate lattice. Therefore, the Hertzian dipole antennae formed by the plasmonic gratings may offer significantly higher radiation resistance and better impedance matching to free space compared with the radiating dipole induced within the semiconductor substrate of conventional large area photoconductive sources. In several embodiments, the plasmonic contact electrodes may utilize high-aspect ratio plasmonic contact electrode gratings. The use of high-aspect ratio plasmonic electrodes may enhance the number of the photocarriers in close proximity to the plasmonic contact electrodes further and, thus, may offer higher terahertz radiation power levels from the large area plasmonic photoconductive sources. Although FIG. 3b illustrates a particular grating design for large area plasmonic photoconductive sources with a particular set of geometric properties, any of a variety of grating designs may be utilized as appropriate to the requirements of specific applications in accordance with embodiments of the invention.

Different geometric parameters ($L_p$, $g_a$, $g_c$, $W_e$) may impact the performance of the large area plasmonic photoconductive terahertz sources. On one hand, the length of the plasmonic gratings, $L_p$, should be selected much shorter than the effective terahertz radiation wavelength to achieve a broad terahertz generation bandwidth and relatively large electric field along the entire grating length for efficient drift of the photocarriers to the plasmonic gratings. On the other hand, reducing the length of the plasmonic gratings, $L_p$, may reduce the percentage of the device active area in comparison with the shadowed area and, thus, may reduce the device quantum efficiency. The gaps between the anode and cathode contact electrodes, $g_a$ and $g_c$, may be selected large enough to prevent electrical breakdown when applying the required bias voltages for efficient drift of photocarriers along the entire grating length. However, increasing the cathode contact electrodes, $g_a$ and $g_c$, may reduce the percentage of the device active area in comparison with the shadowed area and, thus, may reduce the device quantum efficiency. The width of the bias electrodes, $W_e$, should be large enough to accommodate the induced photocurrent during device operation. In the meantime, increasing the width of the bias electrodes, $W_e$, may reduce the percentage of the device active area in comparison with the shadowed area and, thus, may reduce the device quantum efficiency. Additionally, the geometric parameters ($L_p$, $g_a$, $g_c$, $W_e$) may determine the overall device resistance, which may directly impact the noise floor of the radiated terahertz beam. In many embodiments, the optimum designs for the large area plasmonic photoconductive sources should maximize the optical-to-terahertz conversion efficiency and radiation power as well as the terahertz radiation bandwidth.

Fiber-Coupled Electro-Optic Terahertz Detector

Figure 4:
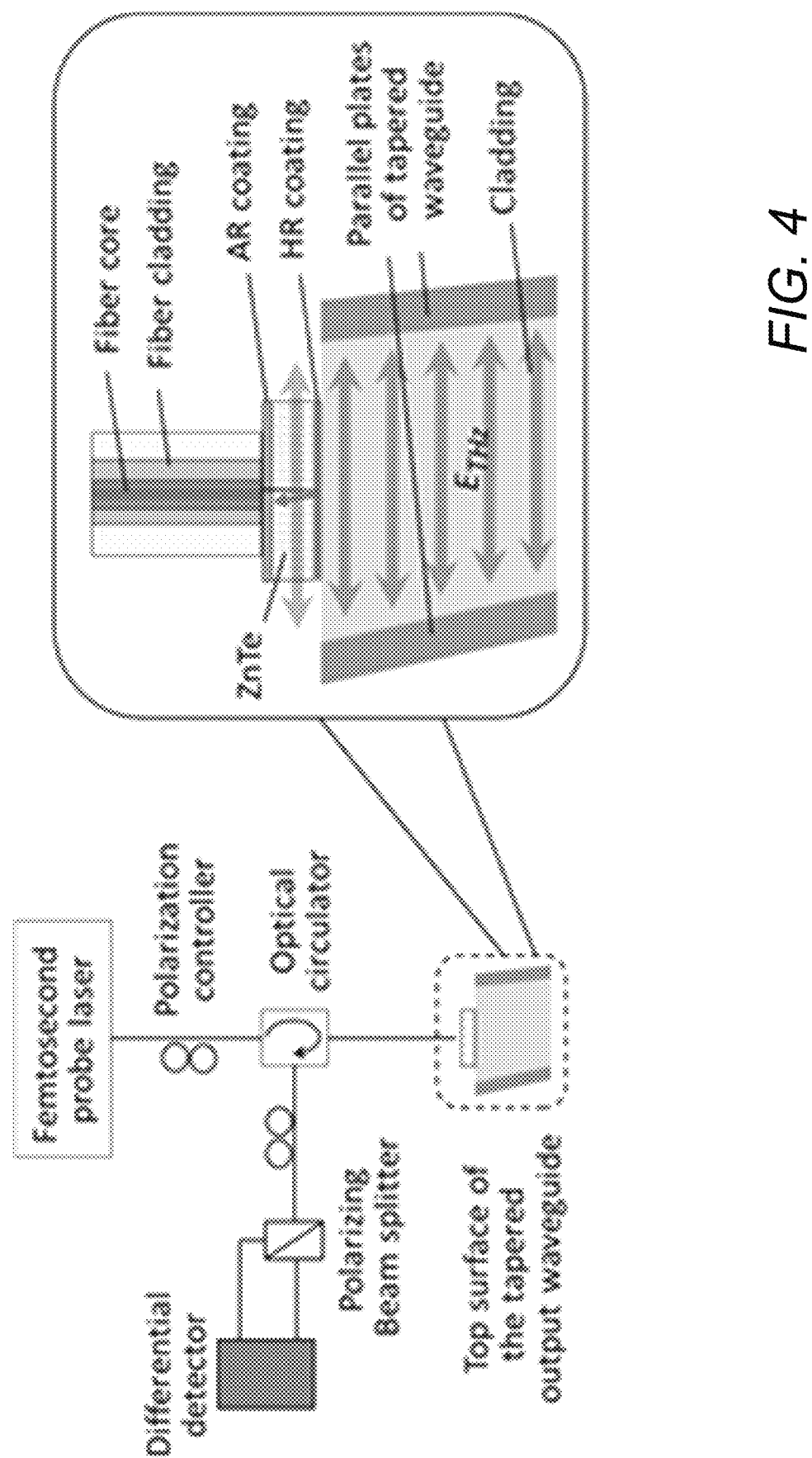
FIG. 4 illustrates a schematic diagram and operation of a fiber-coupled, double-pass, electro-optic terahertz field detector in accordance with an embodiment of the invention.

Another element of a terahertz spectroscopy system in accordance with many embodiments of the invention is a terahertz detection module, which can be designed to be a fiber-coupled, double-pass, electro-optic, field detector. A terahertz detection module with a fiber-coupled, double-pass, electo-optic, field detection in accordance with an embodiment of the invention is illustrated in FIG. 4. Many embodiments may use ZnTe as the nonlinear electro-optic crystal due to its large electro-optic coefficient. After propagating through the curved tapered parallel plate waveguide, the reflected terahertz beam from the biological sample under test may pass through the ZnTe electro-optic crystal for electro-optic field detection. In the meantime, a major portion of the femtosecond optical probe beam, which is normally incident on the ZnTe crystal may pass through the ZnTe crystal through an anti-reflection (AR) coating on the front side of the ZnTe crystal. A large fraction of this beam may reflect back to the original fiber through a high reflectivity (HR) coating layer on the backside of the ZnTe crystal. The phase and, therefore, polarization of the back-coupled portion of the optical probe beam can be modified according to the reflected terahertz electric field interacting with the optical probe beam due to the Pockels effect in the ZnTe crystal. The variations in the phase and polarization of the back-coupled optical probe beam can then be measured by separating the back-coupled optical probe beam through an optical circulator and then separating its orthogonal polarization components through a polarizing beam splitter. The separated orthogonal polarization components can then be measured by a differential photodetector connected to a lock-in amplifier with the optical pump modulation reference, and the relative variations in the polarization state of the back-coupled probe beam can be measured and the reflected terahertz field intensity ($E_{THz}$) may be retrieved, accordingly. In order to achieve a high sensitivity operation, the polarization state of the incident and back-coupled optical probe beams can be adjusted by two polarization controllers to offer a balanced differential detector output in the absence of a terahertz field ($E_{THz}=0$). In many embodiments, different thicknesses of ZnTe crystal ranging from 20 µm to 1 mm may be used for various biosensing applications with different spectral range requirements as appropriate to the requirements of specific applications. Furthermore, in other embodiments, other crystals appropriate to the requirements of a given application can be utilized.

Thicker ZnTe crystals can offer higher terahertz field responsivity/sensitivity levels by allowing longer interaction lengths between the terahertz and optical probe beams. However, thinner ZnTe crystals may offer broader detection bandwidths by reducing the interaction time of the terahertz and optical probe beams and, thus, reducing the temporal resolution of the measured terahertz field. In fact, terahertz spectroscopy over bandwidth of more than 20 THz has been reported by use of 20 µm crystals. Many embodiments of the terahertz spectroscopy system may use thermally expanded fiber cores, which has proven to increase their numerical aperture and offer relatively collimated optical beams inside the ZnTe crystal. For the AR coating layer, many embodiments use a quarter-wave $Si_3N_4$ (refractive index=2) layer, which may offer perfect coupling from the fiber core (refractive index=1.5) to ZnTe (refractive index=2.7) at 1550 nm optical probe wavelengths. For the HR coating layer, many embodiments may use a heavily doped polysilicon film with boron and/or phosphorus doping. The advantage of using a heavily doped polysilicon film over a thin metallic film, commonly used for double-pass electro-optic field detection, is that it can offer higher terahertz field detection sensitivity levels by offering a high terahertz beam transmission and a high optical probe reflection simultaneously. In many embodiments, various polysilicon film thicknesses (less than 1 µm) and doping levels may be utilized to maximize terahertz field detection sensitivity as appropriate to the requirements of specific applications in accordance with embodiments of the invention. In certain embodiments, the $Si_3N_4$ AR coating and polysilicon HR coating layers can be deposited through plasma-enhanced and low-pressure chemical vapor deposition, respectively. Although FIG. 4 illustrates a particular terahertz detection module with a fiber-coupled, double-pass, electo-optic, field detection any of a variety of terahertz detection modules may be specified as appropriate to the requirements of specific applications in accordance with embodiments of the invention.

Many embodiments provide a significant enhancement in the radiation power of a variety of plasmonic terahertz sources. Several embodiments have demonstrated record-high pulsed terahertz radiation power levels from a 0.5×0.5 mm$^2$ large area plasmonic photoconductive terahertz source operating at 800 nm optical pump wavelength range. In many embodiments, the device concept is similar to the terahertz spectroscopy system illustrated in FIG. 3a. However, the device may be fabricated on a semi-insulating (SI) GaAs substrate and the geometry of the plasmonic contact electrode gratings may be optimized for operation at 800 nm optical wavelengths. In many embodiments, the fabrication process begins with patterning the plasmonic contact electrodes using electron-beam lithography, followed by 5/45 nm Ti/Au deposition and liftoff. An optical lithography step with a bi-layer photoresist may be used to pattern the bias lines, which can be followed by 50/550 nm Ti/Au deposition and liftoff. A $Si_3N_4$ anti-reflection coating may be deposited using plasma-enhanced chemical vapor deposition. The shadow metal can be patterned next through optical lithography, followed by 10/90 nm Ti/Au deposition and liftoff. The contact vias can be patterned using optical lithography and opened by etching the $Si_3N_4$ layer using reactive ion etching. Finally, the device may be placed on an optical rotation mount to adjust the polarization of the optical pump with respect to the plasmonic gratings. FIG. 5a shows scanning electron microscope (SEM) images of a fabricated large area plasmonic photoconductive source prototype with 5 µm plasmonic grating length and the plasmonic contact electrode gratings incorporated inside the device active area in accordance with an embodiment of the invention.

In many embodiments, terahertz radiation from the fabricated large area plasmonic photoconductive source is characterized in response to an optical pump beam from a Ti:sapphire mode-locked laser at 800 nm wavelength, with a repetition rate of 76 MHz and a pulse width of 100 fs. Spot size of the optical pump beam can be adjusted to illuminate the entire device active area and polarization of the optical pump beam may be set to be normal to the plasmonic contact electrode gratings. A calibrated pyroelectric detector (for example, provided by Spectrum Detector, Inc. SPI-A-65 THz) can be used to measure radiated power as a function of the bias voltage and optical pump power. A record-high terahertz radiation power of 3.6 mW can be detected at an optical pump power of 150 mW, as illustrated FIG. 5b, exhibiting two orders of magnitude higher optical-to-terahertz conversion efficiencies compared to conventional large area photoconductive terahertz sources. The radiated electric field from the fabricated large area plasmonic photoconductive source can be characterized in a time-domain terahertz spectroscopy setup with electro-optic detection in a 1 mm thick ZnTe crystal (setup shown in FIG. 1). The measured time-domain radiated field and frequency-domain radiated power of the large area plasmonic photoconductive source at 50 mW optical pump power in accordance with an embodiment of the invention are shown in FIG. 5c and FIG. 5d, respectively, exhibiting a terahertz radiation pulse width of 0.5 ps FWHM and a terahertz radiation spectrum in the 0.1-5 THz frequency range with more than 100 dB SNR. In many embodiments, the geometry of the large area plasmonic photoconductive source may be optimized for an ErAs:InGaAs substrate with the highest terahertz radiation power, while maintaining a broad terahertz radiation bandwidth.

Accordingly, many embodiments may use ErAs:InGaAs substrates for plasmonic photoconductive terahertz sources, which have been demonstrated as having record-high terahertz radiation powers from ErAs:InGaAs plasmonic photoconductive terahertz sources in continuous-wave operation. In several embodiments, the large area plasmonic photoconductive terahertz sources may be designed, fabricated, and characterized on ErAs:InGaAs substrate in pulsed operation. One potential challenge is that the low resistivity nature of ErAs:InGaAs can degrade the power and increase the noise of the plasmonic photoconductive terahertz source. To address this challenge, many embodiments use low temperature grown GaAs and ErAs:GaAs as potential substrates for the plasmonic photoconductive terahertz sources, which have demonstrated promising performance at 1550 nm wavelengths for pulsed terahertz generation. Many embodiments may thin down the substrates used for plasmonic terahertz sources fabrication to enhance the coupling efficiency of the generated terahertz beam into the nanoscale terahertz probe.

Many embodiments may utilize the use of thinner ZnTe crystals to extend the terahertz spectroscopy bandwidth over 10 THz. One of the limitations of ZnTe for electro-optic terahertz field detection may be the existence of multiple absorption lines in the terahertz frequency range. To address this limitation and achieve high detection sensitivity over a broad terahertz frequency range, many embodiments use a multi-channel electro-optic terahertz field detector, with different nonlinear electro-optic crystals used in each channel including GaP, $LiNbO_3$, $LiTaO_3$. While these nonlinear electro-optic crystals also have their unique terahertz absorption bands similar to ZnTe, the combination of their spectral response could cover the entire terahertz band from 0.1-10 THz range. The multi-channel electro-optic terahertz field detector can be easily integrated as a part of the time-domain terahertz spectroscopy system, such as the terahertz spectroscopy system illustrated in FIG. 2 in accordance with an embodiment of the invention. In many embodiments, instead of one type of nonlinear electro-optic crystal, multiple types of nonlinear crystals can be mounted on the top surface of the terahertz probe, where the reflected terahertz beam from the biological sample is detected. Since crystal thicknesses of less than 100 μm may be used for broadband terahertz spectroscopy, they can be cut in ~1-2 mm wide stripes by use of a scriber and mounted side-by side on top surface of the terahertz probe. Many embodiments may use up to four different nonlinear electro-optic crystals. For this purpose, in many embodiments the optical probe beam is first split into four separate branches with independent polarization controllers, which are used for detecting the terahertz field in each nonlinear crystal separately. It should be also noted that each detection channel may use a separate set of circulator, polarizing beam splitter, and differential detector to retrieve the terahertz spectrum through each nonlinear crystal independently.

Nanoscale Terahertz Probe

In many embodiments, the terahertz spectroscopy system may also include a nanoscale terahertz probe, which may consist of an embedded curved tapered parallel plate waveguide with a circular-shaped waveguide cross-section, used for focusing the generated terahertz beam onto the biological sample under test with nanoscale focus dimensions and coupling the reflected terahertz beam from the sample to the nonlinear electro-optic crystal for detection. Parallel plate waveguides may allow for a broadband, low dispersion, and low loss terahertz beam transmission through the transverse electromagnetic (TEM) mode. In several embodiments, the curved tapered parallel plate waveguide, with a circular-shaped waveguide cross section, may have a maximum waveguide plate spacing of 1 mm on the terahertz source/detector side of the probe and nanoscale dimensions on the sample side of the probe. The plasmonic photoconductive terahertz source and the nonlinear crystal can be mounted on the top surface of the terahertz probe such that their terahertz field generation/detection axis is oriented in the same direction as that of the waveguide TEM mode. They can be designed to cover approximately half of the available area on the top surface of the terahertz probe each. As explained below, the flexibility of the fabrication technology may allow for selecting different dimensions for the tapered waveguide. Several embodiments may use high-resistivity Si as the waveguide core medium due to its low absorption at terahertz frequencies. The use of Si as the core medium may also offer mechanical stability and a more reliable and repeatable spectroscopy setup compared to a setup based on waveguides without cladding (air filling) by preventing any mechanical bending and deformation when probing different biological samples and simplifying the probe cleaning process between different spectroscopy experiments. Certain embodiments may use Au for the tapered waveguide metal plates, which offers very high permittivity and thus wave confinement at terahertz frequencies. The thickness and spacing of the metallic plates can be set to be larger than the metal skin depth within the spectroscopy frequency range (30-60 nm), offering a lateral resolution of at least 30-60 nm for the terahertz spectroscopy system.

In many embodiments, terahertz wave propagation through the tapered waveguide starts with a TEM propagation mode on the wider side of the waveguide propagating between the waveguide plates and transitions to a plasmonic mode on the narrower side of the waveguide propagating along the waveguide plates. This transition may happen at different waveguide plate separation for each terahertz frequency component. One of the advantages of the nanoscale terahertz probe in accordance with several embodiments of the invention is the close matching between the mode shape of the incident and reflected terahertz wave from the sample under test, which can prevent losses associated with impedance mismatches. Apart from the propagation losses associated with terahertz absorption inside the core material (Si), there can be three other loss mechanisms for the discussed tapered waveguides: resistive/plasmonic losses, which may increase as waveguide dimensions are tapered down, radiation leakage losses because terahertz field may not be totally confined in the lateral direction, and losses associated with excitation of the lowest order transverse-electric (TE1) mode. The frequency dependent losses may also result in dispersion and terahertz pulse broadening. It should be noted that the dispersion (terahertz pulse broadening) of the terahertz probe may not impact the position of the extracted spectral signatures in the terahertz spectroscopy system. However, by broadening the terahertz pulses, it may lower the SNR of the spectroscopy system at higher terahertz frequencies. Despite these loss/dispersion mechanisms, initial theoretical and experimental studies predict up to 2 orders of magnitude enhancement in the intensity of the incident terahertz beam on the sample under test by concentration of a large fraction of the generated terahertz power at the nanoscale end on the tapered waveguides.

In several embodiments, a finite-element-method-based electromagnetic simulator (COMSOL) can be used to analyze propagation of a linearly polarized terahertz wave coupled to an exemplary curved tapered parallel plate waveguide. An example of a fine-element-method based electromagnetic simulator (COMSOL) used to analyze propagation of a linearly polarized terahertz wave coupled to an exemplary curved tapered parallel plate waveguide in accordance with an embodiment of the invention is illustrated in FIG. 6. In particular, FIG. 6 illustrates top and side views of an exemplary curved tapered parallel plate waveguide with a metal plate coverage of 83%, and the electric field profile at the 100 nm-wide waveguide tip at 1 THz, estimated by COMSOL simulations. For this analysis, an x-polarized input beam is considered to be coupled from the waveguide facet with a maximum metal spacing of 1 mm. The wave polarization can be oriented in the same direction as that of the waveguide TEM mode (x-axis). The maximum spacing between the waveguide plates may be set to 1 mm and 100 nm on the terahertz source/detector and the probe tip, respectively. The metal plates can be designed to cover 83% of the waveguide outer circumference (300° radial angle). Simulation results predict a power transmission loss of 20 dB and a field enhancement factor of $10^2$ when focusing radiation at 1 THz at the tip of the probe. This loss may be increased to 30 dB at 10 THz. Simulation results have shown that this loss is mainly associated with energy leakage along the propagation path. For this reason, much lower radiation losses may be estimated on the beam return path to the terahertz detector, with less than 10 dB loss estimated by COMSOL simulations over the 1-10 THz frequency range. Considering >100 dB SNR offered by a plasmonic terahertz source and electro-optic terahertz detector, >60 dB SNR is expected to be achieved by the designed curved tapered parallel plate waveguide without a considerable impact on the spectral bandwidth of the terahertz spectroscopy system. Different geometric parameters of the proposed nanoscale probe may have an impact on the waveguide losses and adjusting the geometric parameters can be used to determine the tradeoff between spatial resolution and SNR of the terahertz spectroscopy system. The results may be used to determine the optimum probe height and waveguide plate coverage angle to minimize terahertz wave leakage out of the waveguide and inhibit excitation of the waveguide TE1 mode in order to minimize waveguide losses while offering a nanoscale lateral resolution. Although FIG. 6 illustrates an exemplary curved tapered parallel plate waveguide with a particular set of geometric parameters, any of a variety of curved tapered parallel plate waveguide designs may be specified as appropriate to the requirements of specific applications in accordance with embodiments of the invention.

A fabrication process flow for implementing a tapered waveguide terahertz probe in accordance with an embodiment of the invention is illustrated in FIGS. 7a-7e. Several embodiments may start with a high-resistivity Si substrate coated with a silicon nitride ($Si_3N_4$) or silicon dioxide ($SiO_2$) on both sides. An electron beam resist or a photoresist can be spin coated on one side of the substrate and patterned to form the desired shape through electron beam lithography or photolithography, respectively. As illustrated in FIG. 7a, the electron beam resist ZEP520A and a circle that is partially cut on two parallel sides may be utilized. Next, this pattern can be transferred to the $Si_3N_4$ or $SiO_2$ layer by reactive ion etching, as illustrated in FIG. 7b to serve as an etch mask for the subsequent step. Afterward, a potassium hydroxide (KOH) bath can be used to etch Si, thereby giving the desired inverted pyramids with partially curved side walls, as illustrated in FIG. 7c in accordance with an embodiment of the invention. KOH etching may have the advantage of providing very smooth waveguide sidewalls. In addition, by adding different additives such as isopropyl alcohol (IPA), adjusting their concentrations and operating temperature, the under-etch and anisotropy during etching can be controlled, thereby enabling the flexibility to create various shapes of polygons accordingly to the initial mask shapes. However, the waveguide tapering angle may be limited to 36° bound by the 54° natural Si etching angle formed by the crystal planes. The KOH etching duration may be adjusted to allow an under-etch below the $Si_3N_4$ or $SiO_2$ mask layer with a total size larger than the $Si_3N_4$ or $SiO_2$ mask. This may allow reaching nanoscale dimensions at the pyramid tip. In certain embodiments, wet etching may then be used to remove the remaining $Si_3N_4$ or $SiO_2$. Before metal evaporation, a slit can be milled on top of the pyramid tip using focused ion beam, as illustrated in FIG. 7d in accordance with an embodiment of the invention such that the two parallel waveguide metals may be separated from each other. Finally, in several embodiments, after the gap milling step, metal (e.g. gold) can be evaporated from the two sides of the pyramid to cover the curved sidewalls in order to realize the proposed tapered waveguide with a pre-defined metal coverage ratio, as shown in FIG. 7e in accordance with an embodiment of the invention. Although FIGS. 7a-7e illustrate a particular sequence of metal evaporation and gap milling, any of a variety of sequences may be utilized as appropriate to the requirements of specific applications in accordance with a number of embodiments of the invention. That is, the metal may be first deposited everywhere and then a focused ion beam can be utilized to remove the metal on the two parallel sidewalls as well as the metal at the pyramid tip. Compared to the sequence illustrated in FIGS. 7a-7e, this fabrication order may provide a more precise control of metal coverage ratio at the expense of longer time to remove large area of metals. As can be appreciated variations of the above processes can also be utilized to construct waveguides as appropriate to the requirements of specific applications.

Additionally, in many embodiments, the tapered waveguide can be obtained through a dry etching process using an inductively coupled plasma (ICP) etcher. A fabrication process for obtaining a tapered waveguide through a dry etching process using an ICP etcher in accordance with an embodiment of the invention is illustrated in FIGS. 8a-8d. The desired mask layer may be deposited on a silicon substrate as illustrated in FIG. 8a. The choice of the mask layer may depend on the recipes during etching and the target geometrical structures. Some examples of the mask layers include silicon dioxide, chromium and chromium/gold among others. The desired pattern may then be created through photolithography or electron beam lithography. Here, a square pattern on silicon dioxide can be used as an example, as illustrated in FIG. 8b. Subsequently, the substrate may be processed in an ICP etcher. An ICP etcher is a system where plasma can be generated through inductive couple of RF power. After applying bias, the ions in the plasma can bombard the substrate, which energizes the reactive species to etch the silicon substrate, as illustrated in FIG. 8c. Because of the under-etch ($\delta$) next to the mask layer, a silicon pyramid can be created, as illustrated in FIG. 8d. By controlling ICP parameters including gas flow, pressure, plasma density and RF/DC power, the tapering angle of the waveguide ($\theta$) can be adjusted. Nevertheless, the maximum etching depth (h) may be restricted to the fundamental limit of dry etching and usually may not exceed several hundred micrometers. Therefore, a combined process of ICP dry etching and KOH wet etching can provide great flexibility for the proposed terahertz probe. For instance, a tapered waveguide that has a small tapered angle at the tip can be fabricated first using ICP etching. Afterward, a KOH etching can be utilized to increase the depth of the waveguide to allow efficient coupling with the source/detector at the input facet. Although FIG. 8 illustrates a particular fabrication process for obtaining a tapered waveguide through a dry etching process using an ICP etcher, any of a variety of sequences may be utilized as appropriate to the requirements of specific applications in accordance with embodiments of the invention.

Figure 9:
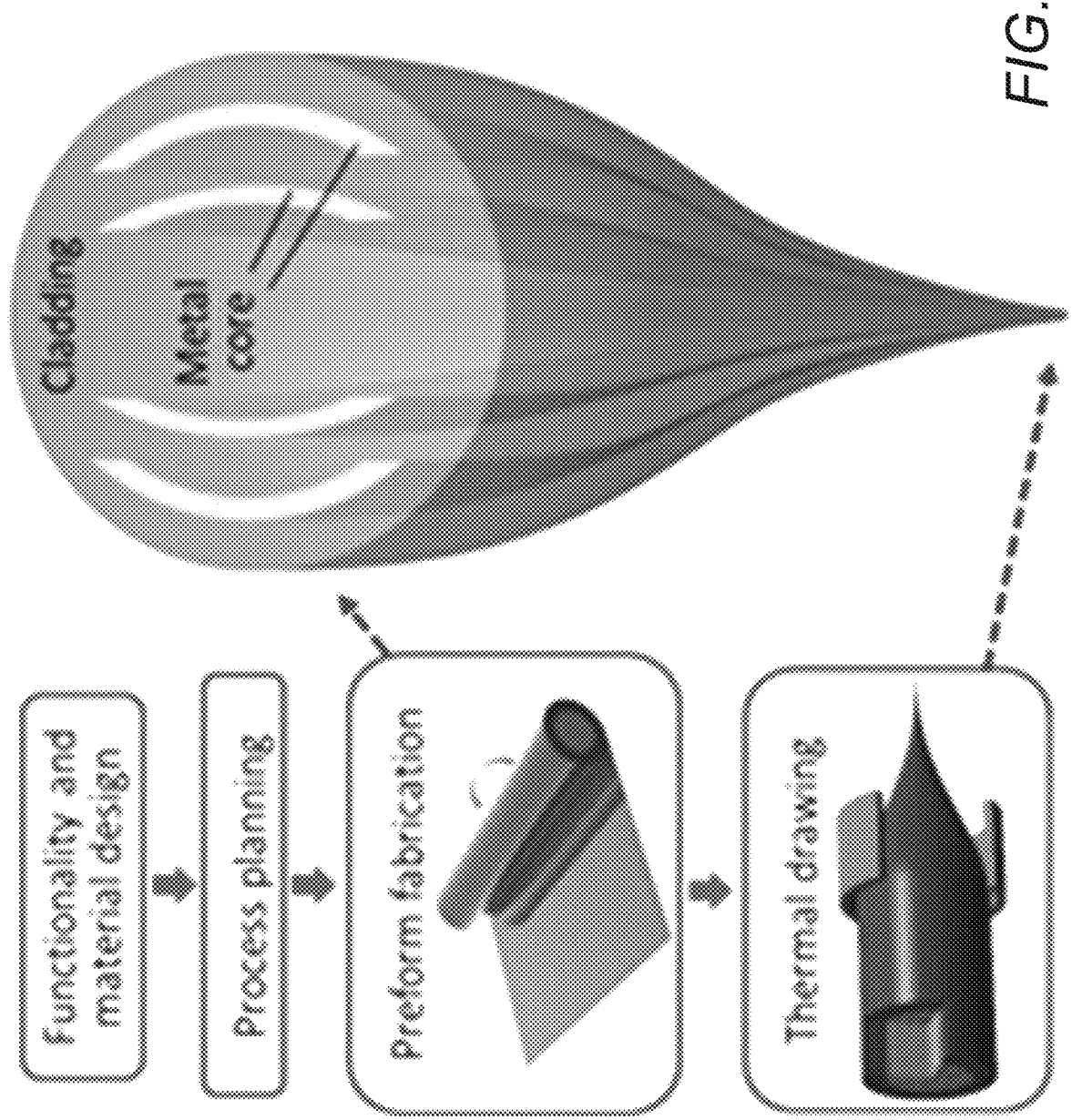
FIG. 9 illustrates a fabrication process for realizing a nanoscale terahertz probe using thermal pulling in accordance with an embodiment of the invention.

Another method for fabricating a tapered waveguide terahertz probe in accordance with several embodiments of the invention is thermal pulling. A proposed fabrication procedure for fabricating a tapered waveguide terahertz probe using thermal pulling in accordance with an embodiment of the invention is illustrated in FIG. 9. There are various challenges that may need to be addressed during the fabrication process. A successful thermal drawing of structures from a macro preform made of multi-materials can be fundamentally limited by a number of key constraints, (1) the viscosity of the most viscous constituent material (i.e. the cladding) should fall between $10^{3.5}$ and $10^7$ Poise at the drawing temperature in order for the process to be controllable. Quartz may be used as the support (cladding) to contain other core materials for cross-sectional stability; (2) the softening or melting temperature of the core material(s) should be lower than or overlap with the drawing temperature. If a crystalline material is to be drawn, low vapor pressure may be desired and its boiling should be avoided; (3) it is desired that cladding and core materials exhibit good adhesion/wetting with each other during and after drawing to avoid cracks, bubbles and fluid instability of the core material(s).

Figure 10C:
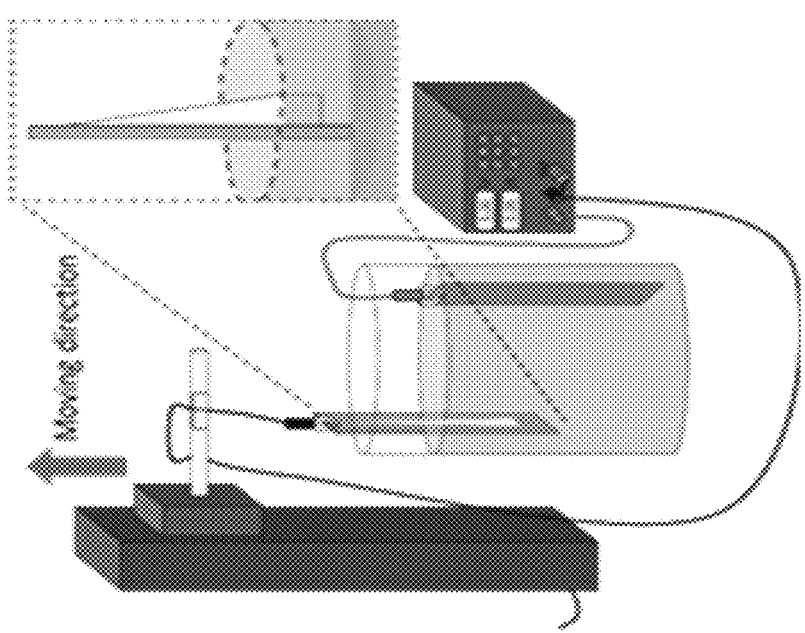
FIGS. 10a-10c illustrate a fabrication process for realizing a terahertz probe using electroplating in accordance with an embodiment of the invention.
Figure 10B:
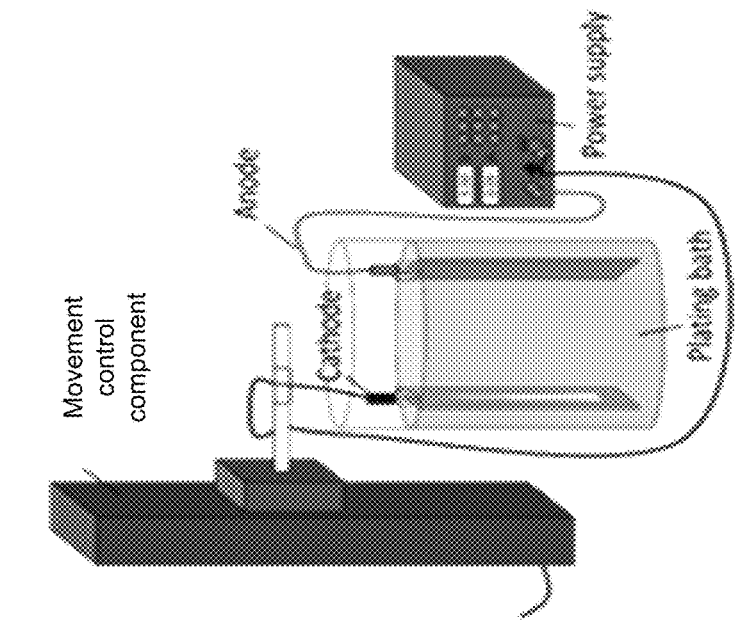
Figure 10A:
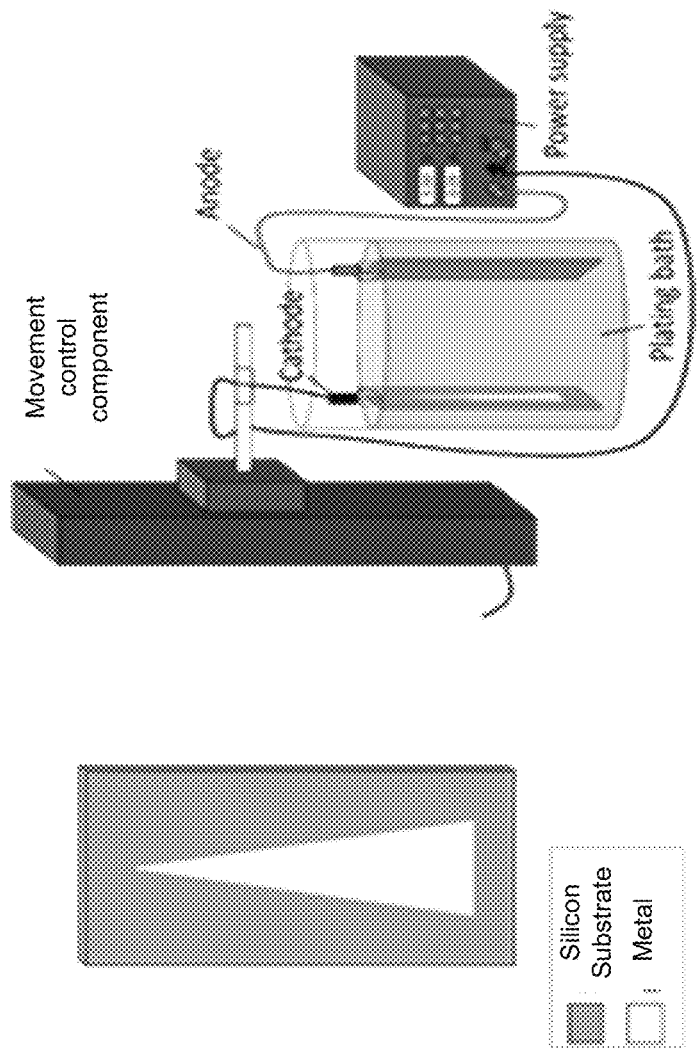

In certain embodiments, electroplating can be used to fabricate the tapered waveguide terahertz probe. A process flow for using electroplating to fabricate a tapered waveguide terahertz probe in accordance with an embodiment of the invention is illustrated in FIGS. 10*a*-10*c*. A metal layer may be patterned on a substrate as the seed layer for the subsequent electroplating. Here, various substrates can be utilized as long as they are non-conductive and are compatible with the chemicals in the plating bath. Some possible options of the substrates include silicon, glass and plastics among others. Additionally, different patterns for the seed layers can be designed for different waveguide geometries. As illustrated in FIG. 10*a*, a planar tapered metal wire on a silicon substrate is used as a demonstration. Next, the substrate with the metal pattern (as cathode) and the anode electrode may be soaked into the plating bath. They may be connected to a power supply that can provide the desired current for electroplating. After turning on the power supply, the metal ion in the plating bath may be attracted to the substrate and deposited on the metal seed layer, thereby increasing its thickness, as illustrated in FIG. 10*b*. To create a tapering shape, the substrate may be mounted on a moving stage, which may pull the substrate gradually out of the plating bath during the plating process. Therefore, the area outside the bath may stop growing thick while the area inside the bath may continue growing thicker and thicker, as illustrated in FIG. 10*c*. The current density may be an important parameter that determines the plating speed. Consequently, by adjusting the current of the power supply and the moving speed of the substrate, the tapering angle of the waveguides can be accurately controlled. Furthermore, nanoscale tip can be obtained by lowering the plating speed. Although specific processes for using electroplating to fabricate a tapered waveguide terahertz probe are described above in FIG. 10, any of a variety of processes could be utilized that result in a waveguide having characteristics appropriate to the requirements of specific terahertz spectroscopy systems in accordance with various embodiments of the invention.

Terahertz Spectroscopy System

In many embodiments, the fabricated nanoscale terahertz probe may be packaged with the large area plasmonic terahertz sources and electro-optic terahertz detectors. For this purpose, the plasmonic terahertz sources and electro-optic crystals can be mounted on the top surface of the nanoscale terahertz probe such that each of them cover half of the area on top of the tapered waveguide input facet. These components can be fixed to their positions by use of a UV-curable epoxy covering the device edges. Next, the pump/probe fibers may be placed on a XYZ translation stage through fiber holders and centered relative to the terahertz source/detector. After achieving optimum alignment for the pump/probe fibers by maximizing the SNR of the spectroscopy system, the position of the fibers can be fixed by use of a UV-curable epoxy. A custom-designed micro-machined holder may be used to mount the terahertz probe on a XYZ translation stage with nanoscale axis control over the biological sample under test. In order to achieve high spatial resolution, it may be important to place the terahertz probe tip within nanoscale distances from the sample under test. The distance between the terahertz probe and biological sample under test may be manually controlled through the XYZ translation stage. However, piezoelectric and/or magnetic actuators and feedback mechanisms can be combined with the nanoscale terahertz probes to offer rapid positioning of the terahertz probe while maintaining high spectral resolution in the presence of topographic variations in the sample under test (similar to commercially available AFM tips).

A deconvolution technique may be used to resolve the spectral information of the sample under test from the temporal waveform of the reflected terahertz beam from each sample. For this purpose, the terahertz spectroscopy system may be used to illuminate the surface of a flat gold mirror with terahertz pulses and record the time-domain reflected terahertz waveform as a reference signal x(t). Assuming that the spectral information is described by a temporal response h(t), the detected waveform y(t) can be expressed as y(t)=h(t)*x(t). Therefore the terahertz spectrum of the sample under test can be extracted as h(f)=y(f)/x(f), where f is the frequency. Depending on the intensity of the reflected beam, which might be very small at high frequency ranges of the terahertz spectrum, window function (e.g. the Gaussian function) may be used to prevent error in the resolved spectrum at the expense of losing high frequency data. This signal processing technique may make the terahertz spectroscopy system immune to possible signal coupling/leakage from the input-pump to output-probe tapered waveguides by calibrating the results relative to a reflective reference sample. The SNR, spectral range, and spatial resolution of the terahertz spectroscopy system may be first tested through a metallic pattern fabricated on a Si test chip with metallic feature sizes varying from nanoscale to microscale. Metallic structures may offer much higher terahertz reflectivity compared to the Si substrate, enabling accurate assessment of the spectroscopy resolution. This testbed may also help troubleshoot the developed signal processing algorithms and procedures.

Following these measurements, the SNR, spectral range, and spatial resolution of the terahertz spectroscopy system may be tested on cancer/healthy lung/cervix tissue samples and the spectral differences between different cells are monitored. Cancer/healthy lung/cervix tissue cells may be chosen as a biological testbed due to the distinct contrast between the healthy and cancer tissues, as a result of water concentration differences and existence of cancer biomarkers, offering a suitable platform to assess the SNR, spectral range, and spatial resolution of the terahertz spectroscopy system in a realistic setting. Histology results can be compared with the terahertz spectroscopy results to reference cancer and healthy cells from each other. It should be noted that a nanoscale probing resolution is not necessarily required for the above-mentioned measurements and this study can be performed to quantify the SNR, spectral range, and spatial resolution of a terahertz spectroscopy system.

In another study, the SNR, spectral range, and spatial resolution of a terahertz spectroscopy system can be evaluated while monitoring dynamics of nanoparticle-mediated intracellular gene delivery. It should be noted that nanoscale probing resolutions may be critical for this particular testbed, which utilizes 30-100 nm-diameter nanoparticles. The ultimate goal is to utilize biodegradable gene delivery nanoparticles and self-assembled polymer-DNA polyplexes and probe their mechanistic structure/function relationships to identify efficient materials for drug delivery. For this purpose, poly(beta-amino ester)s with differential structure may be evaluated and how polymer hydrophobicity and side chain structure determines the rate of polymer hydrolysis and nanoparticle disassembly may be investigated. In this way real-time terahertz spectroscopy can probe the effects of polymer structure on function at the cellular level. Polymer degradation and DNA release from the polymeric nanoparticles are important aspects of safe and effective non-viral gene delivery and many embodiments may be extended to evaluate these functions in vitro in live human brain cancer and human endothelial cells.

Broader Technological Impact

Many embodiments of the terahertz spectroscopy system may extend the scope and potential use of terahertz technology for biological studies that have not been possible before due to the low SNR levels, narrow spectral bandwidth, and resolution limitation of existing terahertz spectroscopy systems. Many embodiments of the terahertz spectroscopy system may allow for extending the knowledge about the operation, structure, and dynamics of biomolecules and biological systems and can open up new possibilities for manipulating and sensing biological processes. More specifically, the spectroscopy system may allow investigating living cells and their interaction inside various biological systems including cell metabolism and reproduction as well as chemical transfer from the environment to cell through cell membrane and possible conformational changes. Many embodiments of the terahertz spectroscopy system may also enable differentiating proteins and providing information about their conformation states and investigating kinetics of molecular motions during protein rearrangement, folding, and binding to other biomolecules. Many embodiments of the terahertz spectroscopy system may also offer a platform for label-free biosensing and manipulating the metabolism, growth and interaction of living cells with their environment. Therefore, the capabilities offered by the terahertz spectroscopy system of many embodiments may be significantly beneficial for biological user communities conducting research on single-molecule biophysics, cellular structure, nanomedicine, protein folding, etc. Furthermore, the proposed tapered waveguide probe in accordance with many embodiments can be also used for terahertz spectroscopy and imaging applications that required micrometer-scale focusing and its usage is not only limited to applications that require nanometer-scale focusing. Moreover, the broadband nature of the probe allows operation at millimeter-wave, microwave, and radio frequencies, among various other frequencies as well.

Furthermore, although specific implementations for a terahertz spectroscopy system are discussed above, any of a variety of implementations utilizing the above discussed techniques can be utilized for terahertz spectroscopy systems in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method of manufacturing a high frequency nanoscope, the method comprising:
    fabricating a tapered waveguide probe with at least partial metal coverage on a plurality of sidewalls, where the tapered waveguide probe comprises an input facet and a tip;
    packaging the tapered waveguide probe with at least one optically pumped source and at least one optically probed detector so that the at least one optically pumped source and the at least one optically probed detector are packaged over the input facet of the tapered waveguide probe;
    wherein the at least one optically pumped source is configured for beam generation; and
    wherein the at least one optically probed detector is configured for beam detection;
    wherein the tapered waveguide probe is configured for focusing a generated beam from the at least one optically pumped source onto a sample under test and coupling the reflected beam from the sample under test to the at least one optically pumped detector for detection; and
    wherein the at least one optically pumped source is a plasmonic photoconductive source or the at least one optically probed detector is a plasmonic photoconductive detector; and
    wherein the tip of the tapered waveguide probe has nanoscale dimensions.

2. The method of claim 1, wherein the at least one optically pumped source is selected from the group consisting of a photoconductive terahertz source and a nonlinear optical source.

3. The method of claim 1, wherein the at least one optically probed detector is selected from the group consisting of a photoconductive terahertz detector and a nonlinear optical terahertz detector.

4. The method of claim 1, wherein the tip of the tapered waveguide probe has a cross-section that is less than 100 micrometers across.

5. The method of claim 1, wherein the high frequency nanoscope is in the terahertz range.

6. The method of claim 1, wherein a frequency range of the high frequency nanospcope is above 1 gigahertz (GHz).

7. The method of claim 1, wherein fabricating the tapered waveguide probe comprises using an etching process to etch a substrate.

8. The method of claim 7, wherein the etching process is selected from the group consisting of a wet etching process and a dry etching process.

9. The method of claim 7, wherein the etching process comprises using a combination of dry etching and wet etching.

10. The method of claim 9, wherein the etching process comprises using inductively coupled plasma (ICP) etching and potassium hydroxide (KOH) etching.

11. The method of claim 1, wherein fabricating the tapered waveguide probe comprises:
providing a silicon (Si) substrate coated with at least one mask layer selected from the group consisting of a silicon nitride ($Si_3N_4$) and a silicon dioxide ($SiO_2$) on both sides of the Si substrate;
spin coating a resist on a first side of the Si substrate, wherein the resist is selected from the group consisting of an electron beam resist and a photoresist; and
patterning the resist to form a shape through at least one lithography technique selected from the group consisting of electron beam lithography and photolithography.

12. The method of claim 11, wherein fabricating the tapered waveguide probe comprises further comprises:
transferring the pattern to the at least one mask layer by reactive ion etching to serve as an etch mask;
etch the Si substrate using a potassium hydroxide (KOH) bath, wherein a KOH etching duration is adjusted to allow an under-etch below the at least one mask layer.

13. The method of claim 12, wherein fabricating the tapered waveguide probe further comprises:
removing the remaining the at least one mask layer using wet etching;
milling a slit on a top of the Si substrate using a focused ion beam; and
evaporating metal from sides of the Si substrate to cover the sidewalls.

14. The method of claim 11, wherein fabricating the tapered waveguide probe further comprises:
depositing the at least partial metal coverage on the plurality of sidewalls; and
using a focused ion beam to remove at least a portion of the metal from the plurality of sidewalls and the tip.

15. The method of claim 1, wherein fabricating the tapered waveguide probe comprises using a dry etching processes using an inductively coupled plasma (ICP) etcher.

16. The method of claim 1, wherein fabricating the tapered waveguide probe comprises:
depositing a mask layer on a silicon (Si) substrate; and
generating a pattern using at least technique selected from the group consisting of photolithography and electron beam lithography.

17. The method of claim 16, wherein the mask layer is selected from the group consisting of silicon dioxide ($SiO_2$), chromium, and chromium/gold.

18. The method of claim 16, wherein fabricating the tapered waveguide probe further comprises:
processing the Si substrate in an ICP etcher, wherein the ICP etcher generates plasma through inductive couple of RF power; and
applying bias to etch the Si substrate.

19. The method of claim 18, wherein fabricating the tapered waveguide probe comprises further comprises using potassium hydroxide (KOH) wet etching.

20. The method of claim 18, wherein a tapering angle of the tapered waveguide probe is adjusted by controlling at least one ICP parameter, wherein the at least one ICP parameter is selected from the group consisting of gas flow, pressure, plasma density, and RF/DC power.

21. The method of claim 1, wherein fabricating the tapered waveguide probe comprises using thermal pulling.

22. The method of claim 1, wherein fabricating the tapered waveguide probe comprises using electroplating.

23. The method of claim 22, wherein fabricating the tapered waveguide probe further comprises patterning a metal layer on a substrate as a seed layer.

24. The method of claim 23, wherein the substrate is non-conductive and is compatible with chemicals in a plating bath.

25. The method of claim 24, wherein the substrate is selected from the group consisting of silicon, glass, and plastics.

26. The method of claim 23, wherein fabricating the tapered waveguide probe further comprises:
soaking the substrate with the patterned metal layer, as cathode, and an anode electrode in a plating bath, wherein the substrate is mounted on a moving stage which gradually pulls the substrate out of the plating bath during plating.

27. The method of claim 26, wherein adjusting a current of a power supply and a moving speed of the substrate controls a tapering angle of the tapered waveguide probe.

28. The method of claim 1, wherein the at least one optically pumped source and the at least one optically probed detector are mounted on a larger cross section side of the tapered waveguide probe.

29. The method of claim 1, further comprising mounting the tapered waveguide probe on a XYZ translation stage with nanoscale axis control.

30. The method of claim 1, wherein the plasmonic photoconductive source incorporates a plurality of plasmonic contact electrodes within an active area of the plasmonic photoconductive source, or the plasmonic contact electrodes utilize high-aspect ratio plasmonic electrode gratings.

* * * * *